United States Patent
Wen

(10) Patent No.: US 11,263,618 B2
(45) Date of Patent: Mar. 1, 2022

(54) INFORMATION PROCESSING METHOD AND APPARATUS

(71) Applicant: Tencent Technology (Shenzhen) Company Limited, Shenzhen (CN)

(72) Inventor: Yutao Wen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 248 days.

(21) Appl. No.: 16/013,780

(22) Filed: Jun. 20, 2018

(65) Prior Publication Data

US 2018/0300710 A1 Oct. 18, 2018

Related U.S. Application Data

(63) Continuation-in-part of application No. PCT/CN2017/086922, filed on Jun. 2, 2017.

(30) Foreign Application Priority Data

Jun. 2, 2016 (CN) .......................... 201610390583.2

(51) Int. Cl.
*G06Q 20/32* (2012.01)
*G06Q 20/40* (2012.01)
(Continued)

(52) U.S. Cl.
CPC ..... *G06Q 20/3255* (2013.01); *G06Q 20/0457* (2013.01); *G06Q 20/223* (2013.01);
(Continued)

(58) Field of Classification Search
None
See application file for complete search history.

(56) References Cited

U.S. PATENT DOCUMENTS

2009/0287579 A1* 11/2009 Walker .................. G06Q 20/18 705/21
2011/0270665 A1* 11/2011 Kim .................. G06Q 30/0233 705/14.33

(Continued)

FOREIGN PATENT DOCUMENTS

CN 103368984 A 10/2013
CN 104202396 A 12/2014
(Continued)

OTHER PUBLICATIONS

Tencent Technology, ISRWO, PCT/CN2017/086922, Aug. 28, 2017, 7 pgs.

(Continued)

*Primary Examiner* — William J Jacob
(74) *Attorney, Agent, or Firm* — Morgan, Lewis & Bockius LLP

(57) ABSTRACT

An information processing method includes receiving a first request sent by a first terminal, the first request carrying at least current location information of the first terminal and identification information of a first user; obtaining, according to the identification information of the first user, attribute information of an electronic red envelope, the attribute information of the red envelope comprising at least destination location information; determining whether the location information of the first terminal and the destination location information satisfy a preset first condition; determining a first amount and carrying the first amount in a first response if the location information of the first terminal and (Continued)

the destination location information satisfy the first condition, the first amount being used for representing a red envelope amount dispensed to the first terminal; and sending the first response to the first terminal.

11 Claims, 11 Drawing Sheets

(51) Int. Cl.
  *G06Q 20/22* (2012.01)
  *G06Q 20/04* (2012.01)
  *H04L 51/00* (2022.01)
  *H04M 1/72457* (2021.01)
  *H04L 51/046* (2022.01)
  *H04L 51/222* (2022.01)
  *H04L 51/52* (2022.01)
  *H04M 1/72436* (2021.01)
  *G06Q 50/00* (2012.01)

(52) U.S. Cl.
  CPC ....... *G06Q 20/3224* (2013.01); *G06Q 20/405* (2013.01); *H04L 51/046* (2013.01); *H04L 51/14* (2013.01); *H04L 51/20* (2013.01); *H04L 51/32* (2013.01); *H04M 1/72457* (2021.01); *G06Q 50/01* (2013.01); *H04M 1/72436* (2021.01)

(56) References Cited

U.S. PATENT DOCUMENTS

| | | | | |
|---|---|---|---|---|
| 2013/0304642 | A1* | 11/2013 | Campos | G06Q 20/36 705/41 |
| 2014/0149260 | A1* | 5/2014 | Konakanchi | G06Q 30/0635 705/26.81 |
| 2016/0012465 | A1* | 1/2016 | Sharp | G06Q 20/386 705/14.17 |
| 2016/0063498 | A1* | 3/2016 | Li | G06Q 20/405 705/44 |
| 2016/0234192 | A1* | 8/2016 | Shao | G06Q 30/0609 |
| 2017/0270551 | A1* | 9/2017 | Chen | H04L 67/26 |

FOREIGN PATENT DOCUMENTS

| | | |
|---|---|---|
| CN | 104618226 A | 5/2015 |
| CN | 104881124 A | 9/2015 |
| CN | 105049539 A | 11/2015 |
| CN | 105163279 A | 12/2015 |
| CN | 105407036 A | 3/2016 |
| CN | 105447103 A | 3/2016 |
| CN | 106056369 A | 10/2016 |
| JP | 2011060072 A | 3/2011 |

OTHER PUBLICATIONS

Tencent Technology, IPRP, PCT/CN2017/086922, Dec. 4, 2018, 6 pgs.

* cited by examiner

INFORMATION PROCESSING METHOD AND APPARATUS

CROSS-REFERENCE TO RELATED APPLICATIONS

This application is a continuation-in-part application of PCT/CN2017/086922, entitled "INFORMATION PROCESSING METHOD AND APPARATUS" filed on Jun. 2, 2017, which claims priority to Chinese Patent Application No. 201610390583.2, filed with the State Intellectual Property Office of the People's Republic of China on Jun. 2, 2016, and entitled "INFORMATION PROCESSING METHOD AND APPARATUS," all of which are incorporated by reference in their entirety.

FIELD OF THE TECHNOLOGY

The present disclosure relates to electronic technologies, and in particular, to an information processing method and apparatus.

BACKGROUND OF THE DISCLOSURE

With the development of Internet technologies, a terminal such as a mobile phone becomes a necessity in people's life. Electronic red envelopes derived based on mobile Internet technologies have not been unfamiliar to people any more.

The "electronic red envelopes" are popular because they support various types of red envelopes. That is, a user, on an electronic red envelope, not only can upload a personalized picture of blessing, but also can write a greeting of a personal characteristic. The "electronic red envelope" is more vivid and more contemporary than a traditional model of "a red paper envelope and cash." In addition, a user that receives the electronic red envelope can spend the amount paying on a network platform, namely, for electronic payments. Therefore, the practicability of the "electronic red envelope" is stronger than the traditional "red paper envelope and cash." Moreover, operations of both grabbing "the electronic red envelope" and sending "the electronic red envelope" are simple.

However, the existing electronic red envelopes are used without a threshold and are not limited by an area. Further, the existing electronic red envelopes are sent online and also grabbed online. Thus, a user sending the red envelope and a user grabbing the red envelope do not need to have any interactions. That is, the form of the existing electronic red envelopes is relatively undiversified, actions of sending the red envelopes and grabbing the red envelopes are completed merely online, and participators do not need to interact with each other. As a result, a sense of participation of the participators is relatively weak. In addition, the existing electronic red envelopes are easy to be affected by a plug-in or software for grabbing the electronic red envelopes, thereby destroying the positivity of the participators. The plug-in and the software for grabbing the electronic red envelopes become prevalent because the existing electronic red envelopes have fewer interactions among the users and are easy to be simulated. Accordingly, a technology that can resolve the above-noted problems is in a great need.

SUMMARY

In view of this, exemplary embodiments of the present disclosure provide an information processing method and apparatus to resolve the above-noted problems in the existing technology so that the impact of the red envelope plug-in, software, and the like can be avoided, thereby improving the interactions among the users, strengthening their relationships, and guaranteeing fairness of grabbing the electronic red envelopes.

The technical solutions of the exemplary embodiments of the present disclosure are implemented as follows:

According to a first aspect, an exemplary embodiment of the present disclosure provides an information processing method performed at an information processing system including a first terminal, a second terminal and a computer server that is communicatively connected to the first terminal and the second terminal, the method including:

receiving a first request for an electronic red envelope sent by the first terminal, the first request carrying at least current location information of the first terminal and identification information of a first user who uses the first terminal;

obtaining, according to the identification information of the first user, attribute information of the electronic red envelope, the attribute information of the red envelope comprising at least destination location information;

determining whether the current location information of the first terminal and the destination location information satisfy a preset first condition;

determining a first amount of the red envelope and carrying the first amount in a first response if the current location information of the first terminal and the destination location information satisfy the first condition, the first amount being dispensed to the first user; and sending the first response from the server to the first terminal.

According to a second aspect, an exemplary embodiment of the present disclosure provides a computer server that is communicatively connected to a first terminal and a second terminal. The computer server one or more processors; memory coupled to the one or more processors; and a plurality of instructions stored in the memory that, when executed by the one or more processors, cause the computer server to perform the aforementioned operations.

According to a third aspect, an exemplary embodiment of the present disclosure provides a non-transitory computer readable storage medium storing a plurality of instructions configured for execution by one or more processors of a computer server, which is communicatively connected to a first terminal and a second terminal, the plurality of instructions, when executed by the one or more processors, causing the computer server to perform the aforementioned operations.

In this way, the information processing method and apparatus of the present disclosure can resolve the above-noted social problems, guarantee the fairness of grabbing the red envelope, and also strengthen and improve the relationship of the participants. Details of one or more exemplary embodiments of the present disclosure are provided in the following accompanying drawings and descriptions. Other features, objectives, and advantages of the present disclosure become clear in the specification, the accompanying drawings, and the claims. In this way, the impact of a red envelope plug-in and the like can be avoided, thereby guaranteeing fairness.

DESCRIPTION OF EMBODIMENTS

Figure 1:
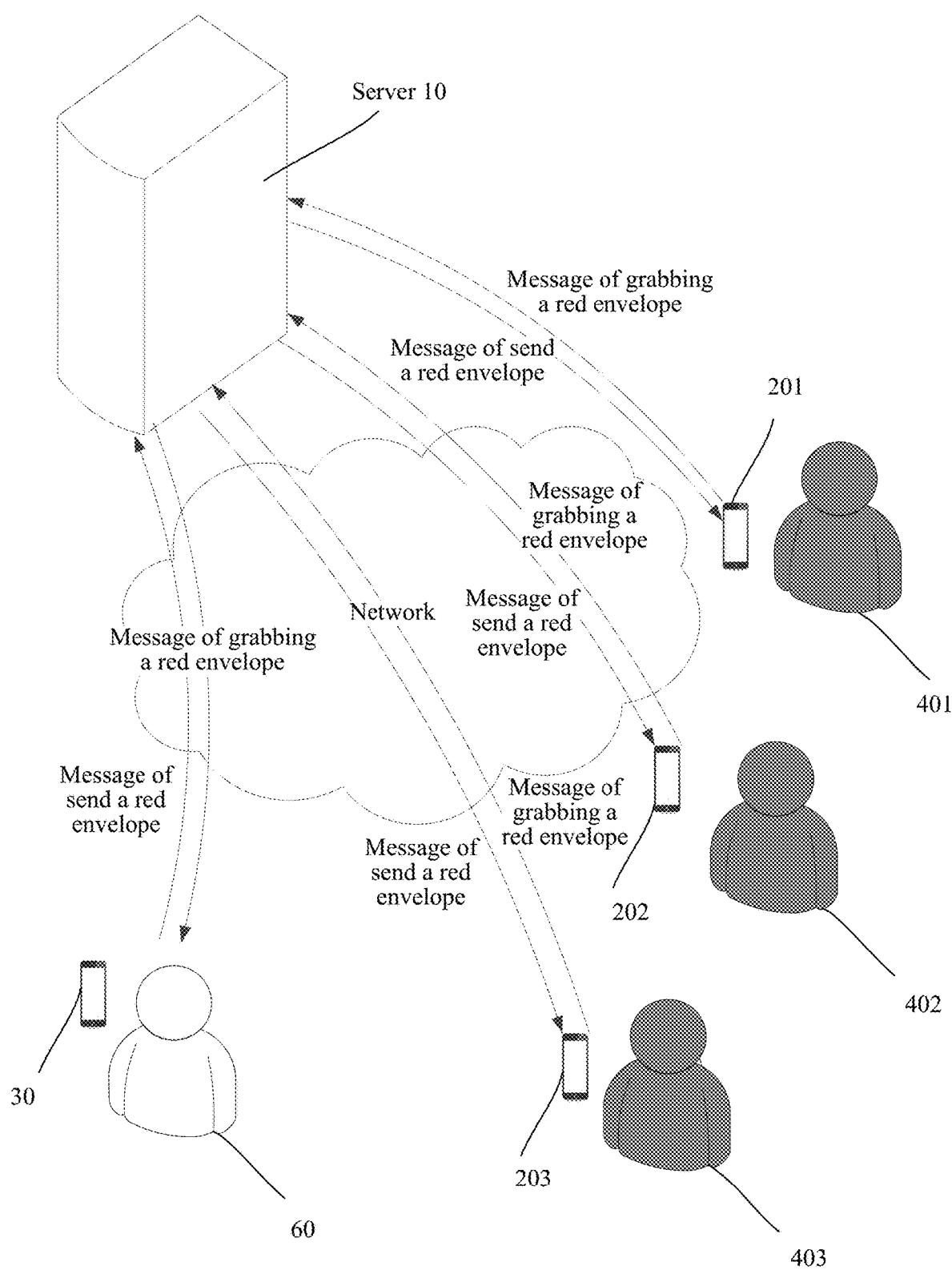
FIG. 1 is a schematic diagram of a network architecture according to an exemplary embodiment of the present disclosure.

First, a network architecture related to an exemplary embodiment of the present disclosure is described with reference to FIG. 1. As shown in FIG. 1, this exemplary embodiment relates to devices including at least three parties. The first party may be an electronic device (a second terminal 30) of a user that sends an electronic red envelope. The second party may include a plurality of electronic devices (first terminals 201 to 203 in FIG. 1 for example) of users that grab the red envelope. The third party may be a server 10 that establishes a payment platform.

In an exemplary implementation process, for an activity of grabbing a red envelope, there is usually only one corresponding terminal (the second terminal 30) that sends the red envelope, and at least one or more corresponding terminals (the first terminals 201 to 203) that are communicatively connected to the only one corresponding terminal to receive and grab the red envelope. The three first terminals 201 to 203 in FIG. 1 are merely used as an example for description. Actually, the number of first terminals is not limited to 3 as shown in FIG. 1, and may include one, two, or several hundreds.

In the exemplary implementation process, electronic devices may be mobile electronic devices and may alternatively be fixed electronic devices. The mobile electronic devices may be smartphones, personal digital assistants, vehicle terminals, tablet computers, and the like. The fixed electronic devices may be desktop computers, and the like. In FIG. 1, the second terminal 30 corresponds to a second user 60 who sends the red envelope, and the first terminals 201 to 203 correspond to first users 401 to 403 who grab the red envelope sent by the second user 60.

Figure 2A:
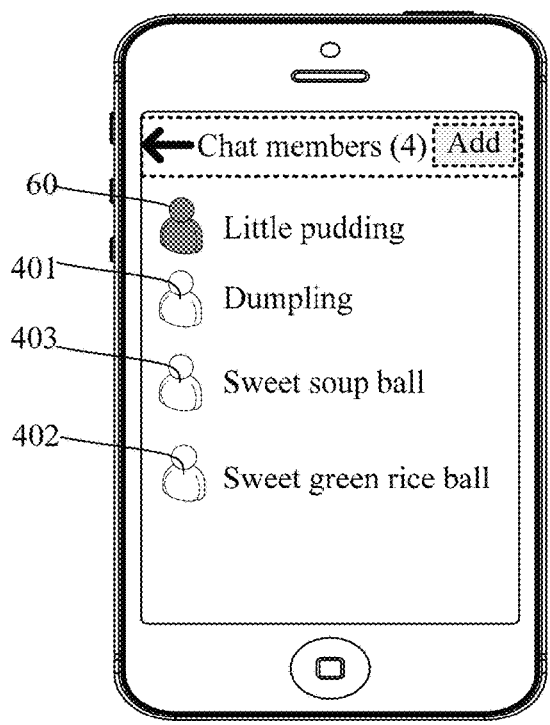
FIG. 2A and FIG. 2B are schematic diagrams of a scenario according to an exemplary embodiment of the present disclosure.

Referring to FIG. 2A, it is assumed that the second user 60 and the first users 401 to 403 create a chat group. The chat group may include these four members, the chat-names of which are little pudding, dumpling, sweet soup ball and sweet green rice ball, respectively. In this case, as show in FIG. 2B, on a display interface of the second terminal 30, the second user 60, little pudding, sends a red envelope in the group.

Figures 3A, 3B:
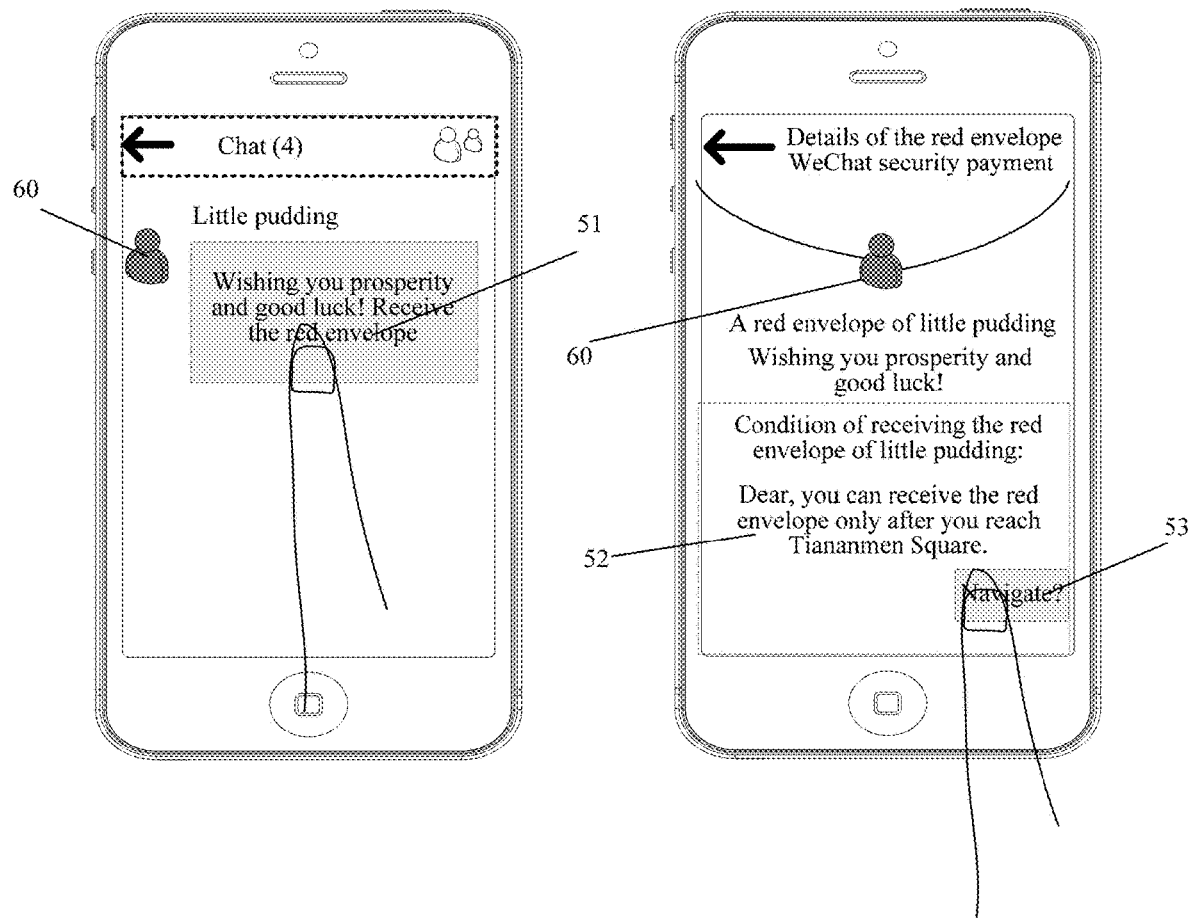
FIG. 3A and FIG. 3B are schematic diagrams of another scenario according to an exemplary embodiment of the present disclosure.

FIG. 3A shows a display interface of one of the first terminals 401, 402 and 403, namely, a display interface of one of the first users who grabs the red envelope. In the display interface of FIG. 3A, the one of the first users can see that the second user 60, little pudding, sends a red envelope in the group. When the one of the first users wants to receive the red envelope, he/she clicks on "receive the red envelope" in a red envelope message 51 to grab the red envelope from the second user 60, little pudding.

In the conventional art, namely, if the red envelope is sent as a conventional electronic red envelope, the display interface of FIG. 3A is redirected to FIG. 4A instead of FIG. 3B (which will be described in detail later).

Figures 4A, 4B:
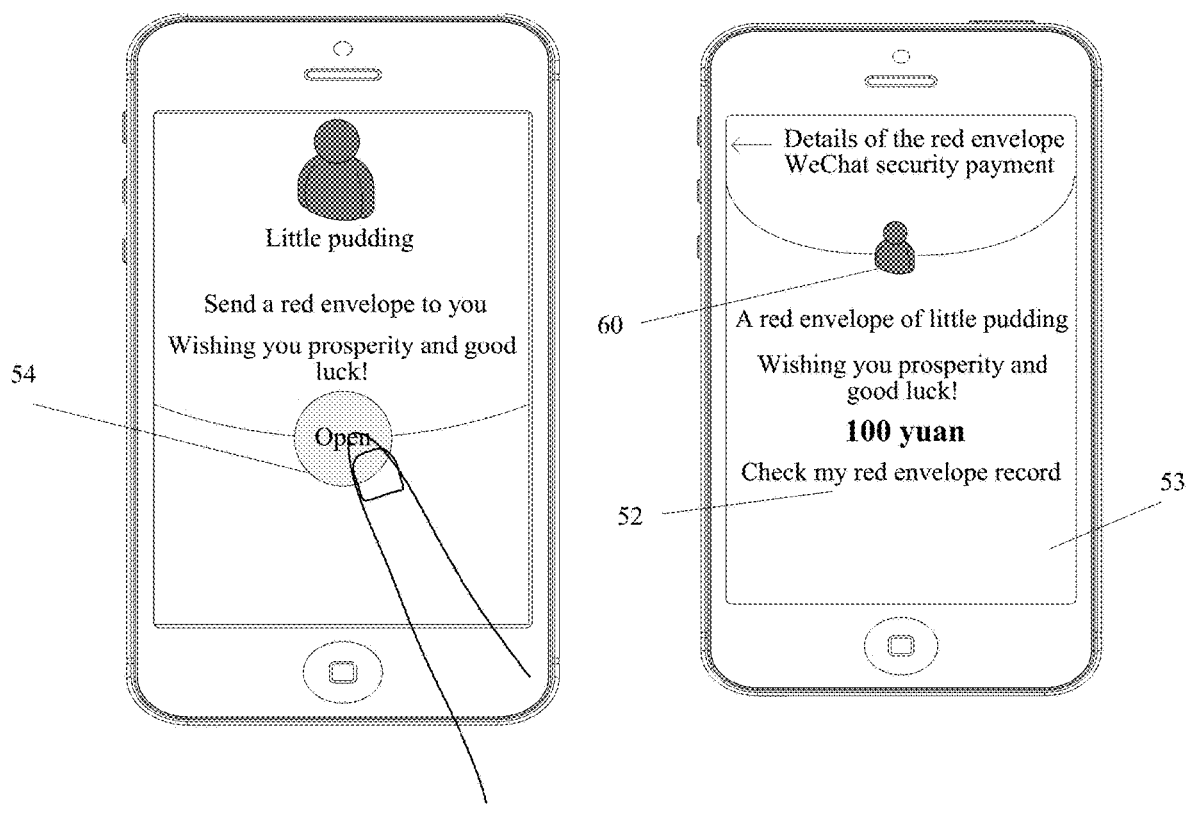
FIG. 4A and FIG. 4B are schematic diagrams of another scenario according to an exemplary embodiment of the present disclosure.

As shown in FIG. 4A, the display interface of the first terminal shows that the one of the first users, who grabs the red envelope, receives the red envelope from the second user 60. When he/she clicks on a button 54 on the display interface of FIG. 4A, the display interface of FIG. 4A is redirected to FIG. 4B. As shown in FIG. 4B, an amount of the red envelope that is received by the one of the first users is displayed on the display interface, and the amount is 100 Yuan. These operations in FIGS. 2A, 2B, 3A, 4A, and 4B (without operation in FIG. 3B, which requires interaction between the participants) just show how an example of the conventional electronic red envelope is sent and grabbed, and they are all completed online. Thus, the participants in the conventional electronic red envelope do not need and also have no motivation to interact with each other. As a result, a sense of participation is weak. Even though the conventional electronic red envelope is convenient and fast, the relationship between the participants does not get closer or improved due to the lack of interactions from each other.

Before some exemplary embodiments of the present disclosure are described, two terminologies are defined as follows:

Location Based Service (LBS), is a value-added service that obtains location information (for example, a geographic coordinate or a terrestrial coordinate) of a mobile terminal user by using a radio communications network of a telecommunications or mobile operator or in an external positioning manner, and provides a corresponding service for the user in support of a geographic information system (GIS). The radio communications network may include a 2G mobile communications network based on Global System for Mobile Communications (GSM), a 3G mobile communications network based on a Code Division Multiple Access (CDMA) technology, and 4G and 5G mobile communications networks, and the external positioning manner including a manner that implements positioning based on a global positioning system (GPS); and Electronic Red Envelope is different from a tradition paper red envelope. In the exemplary embodiments of the present disclosure, the electronic red envelope is just referred to as a red envelope, and it is a manner of delivering money of a fixed amount or a random amount based on an application program such as social software.

To resolve the technical problem discussed in the Background of Disclosure, the following exemplary embodiments will describe a red envelope that is implemented by using the LBS. Also, the red envelope may be implemented by using both the LBS and an effective time point, in which an original red envelope is associated with a specified location by using the LBS and has an attribute of effective time. This is a new red envelope mode of sending a red envelope online and grabbing the red envelope offline. Under this new red envelope mode, technical solutions provided in the exemplary embodiments of the present disclosure can resolve the problem in that a conventional red envelope is simply sent and grabbed online, which it is difficult to improve and strengthen the relationship between the users even though a chat atmosphere is active.

The red envelope implemented based on the LBS and the effective time point may have a fixed amount or a random amount. This may be decided by the user who sends the red envelope at the time when the sender makes the red envelope. Alternatively, a terminal may perform a default selection of the fixed amount or the random amount for a red envelope. Related information of the red envelope may be visible only to a member in a chat group where the red envelope is located. When the member reaches the position associated with the red envelope within the effective time, the member is able to obtain the red envelope. The related information may include the LBS information and the effective time.

As described above, the red envelope implemented by the LBS and the effective time point in the exemplary embodiments of the present disclosure, after being associated with a specific position, enables the users to truly participate in the activity of grabbing the red envelope, thereby preventing a certain user who does not show up in the chat group from grabbing the red envelope, and also increasing difficulty of the plug-in for grabbing the red envelope.

Next, some exemplary embodiments of the technical solutions of the present disclosure will be described in detail with reference to accompanying drawings.

One exemplary embodiment of the present disclosure provides an information processing method. The method may be applied to a server of a third-party platform. The server is called a third party with regard to two parties: a first party who is the user to send a red envelope and a second party who is the user to grab the red envelope. In an exemplary implementation process, the third-party platform may be a server as a payment platform.

In the exemplary embodiment, the information processing method may be performed by one or more processors in the server of the third-party platform by using program code. The program code may be stored in a computer storage medium. Thus, the server of the third-party platform may include at least the processor and the storage medium.

Figure 6:
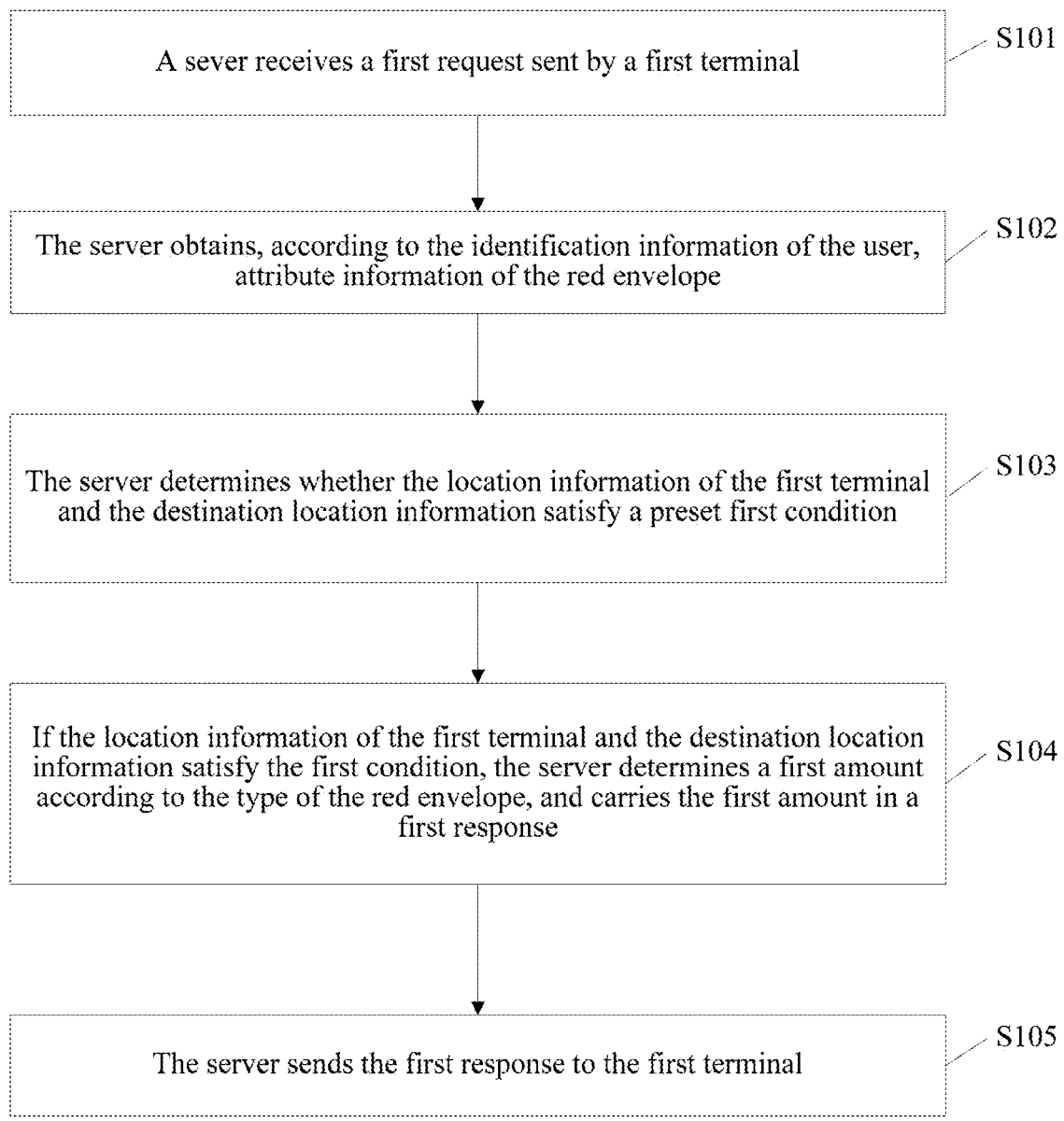
FIG. 6 is a schematic diagram of a process for implementing an information processing method according to an exemplary embodiment of the present disclosure.

The following describes a technical solution of this exemplary embodiment based on the network architecture of FIG. 1. FIG. 6 is a schematic diagram of a process for implementing an information processing method according to an exemplary embodiment of the present disclosure. As shown in FIG. 6, the information processing method is performed as follows:

At Step S101, a sever receives a first request sent by a first terminal. Herein, the first request is used for initiating a request for grabbing a red envelope to the server. The first request carries at least current location information of the first terminal and identification information of a first user. The first terminal corresponds to a terminal of the first user.

At S102, the server obtains, according to the identification information of the user, attribute information of the red envelope, which may include at least destination location information. Herein, the destination location information is implemented by using the LBS. The destination location information may be a point or a range. For example, a point (longitude and latitude information) may be used as a center of a circle and a R may be used as a radius of the circle, and the circle is the destination location information. Alternatively, several points may be determined, for example three, four, or even more points, to form a closed area by connecting these points. The closed area may be as the destination location information. It should be noted that even if the destination location information is set to a point (a single point), it is actually still a range, because the location information of a mobile terminal user obtained by using a radio communications network of a telecommunications or mobile operator or in an external positioning manner always has a certain deviation (for example, a deviation of a civil GPS is usually 10 m).

Herein, the red envelope may be a fixed amount red envelope, a random amount red envelope, or another type of red envelope. If the red envelope is the fixed amount, amounts sent to users that grab the red envelope are the same. If the red envelope is the random amount, amounts sent to users that grab the red envelope are random, namely, amounts obtained by a previous user that grabs the red envelope and a later user that grabs the red envelope may be not the same. In other words, the amounts are randomly dispensed in the random amount red envelope. In an exemplary embodiment, when the type of the red envelope is the fixed amount, the attribute information of the red envelope may further include an amount of each red envelope. For example, as shown in FIG. 4B, the second user sets the type of the red envelope to the fixed amount, and thus the amount of each red envelope is 100 yuan.

At Step S103, the server determines whether the location information of the first terminal and the destination location information satisfy a preset first condition. Herein, when the destination location information is a point, the first condition may include a circle with this point as its center and a preset R as its radius. When the destination location information is a closed area, the first condition may include that the location information of the first terminal is within the closed area corresponding to the destination location information.

At Step S104, if the location information of the first terminal and the destination location information satisfy the first condition, the server determines a first amount, and carries the first amount in a first response. Herein, in an exemplary implementation process, the attribute information of the red envelope may further include information used for determining a red envelope amount. For example, the information used for determining the red envelope amount may include a type of the red envelope. In this way, that the server determines a first amount may include: determining a first amount according to the type of the red envelope, the first amount being used for representing a red envelope amount dispensed to the first terminal, and the type of the red envelope including the fixed amount red envelope and the random amount red envelope.

At Step S105, the server sends the first response to the first terminal. Herein, the first terminal receives the first response sent by the server, and displays, according to the first response, the first amount on a display interface of the first terminal. In an exemplary implementation process, as shown in FIG. 4B, an interface displays that an amount of a red envelope received by a user that grabs the red envelope is 100 yuan.

In an exemplary embodiment of the present disclosure, that the server determines a first amount according to the type of the red envelope may include: determining a first amount according to the amount of each red envelope in the attribute of the red envelope, when the type of the red envelope is the fixed amount, that is, the first amount is the amount of each red envelope set by the user, for example, the 100 yuan as noted in step S102. If the type of the red envelope is the random amount type, the server randomly generates an amount, as the first amount. It should be noted that when the type of the red envelope is the random amount type, although the first amount is randomly generated, generation of the first amount generally has some rules. For example, if a total amount of the red envelope is 2 yuan and a number of red envelopes is two, then the first amount randomly generated should be between 0 yuan and 2 yuan. If a first amount of a first red envelope is 0.43 yuan, it can be determined by using a simple calculation that an amount of a second red envelope is 1.57 yuan, that is, the sum of the amount 0.43 of the first red envelope and the amount 1.57 of the second red envelope is the total amount 2 yuan of the red envelope.

According to the exemplary embodiments described above, the method of the present disclosure may further include: Step S1041, at which the server obtains the number of red envelopes that have been currently sent; Step S1042, at which the server determines whether the number of the red envelopes that have been currently sent is less than the total number of the red envelopes; and Step S1043, at which the server determines the first amount according to a type of an red envelope, if the number of the red envelopes that have been currently sent is less than the total number of the red envelopes. Herein, as described above, if the total number of the red envelopes is two, the server determines that two red envelopes have been currently sent, that is, determines that all red envelopes have been received. Thus, when a third person (the third person of the first users) grabs a red envelope (sends the first request to the server), the server refuses to send any red envelope and prompts that all of the red envelopes have been received, The red envelope implemented by the LBS in the exemplary embodiments of the present disclosure may be combined with a team activity. For example, when climbing a mountain, an organizer (the second user) may initiate an activity of grabbing a red envelope in a group by using a mobile phone (a second terminal) of the organizer. The destination location information is specified at a place A of a mountaintop and only a member that reaches the place A of the mountaintop can grab the red envelope. When a member S (a first user) in the group reaches the place A of the mountaintop, a mobile phone (a first terminal) of the member S sends a request (a first request) for grabbing the red envelope to a server (a first server 10) of the red envelope, and then the server of the red envelope performs the foregoing step S101 to step S105 and finally returns a message of grabbing the red envelope to the mobile phone of the member S. Referring to FIG. 4B, the interface displays that an amount of the red envelope received by the member S is 100 yuan.

In the exemplary embodiment of the present disclosure, an original red envelope may be associated with a specified location by the LBS. This is a new red envelope mode of sending a red envelope online and grabbing the red envelope offline. In this way, a technical solution provided in the exemplary embodiment of the present disclosure can resolve the problem in that a conventional electronic red envelope is simply sent and grabbed online, and thus cannot improve and strengthen the relationship between the users even if it can make a chat atmosphere active.

In another exemplary embodiment of the present disclosure, the method may further include that: the attribute information of the red envelope may further include deadline information. The deadline information is used for representing a deadline for stopping dispensing the red envelope. The method may further include:

Step S106: The server determines timestamp information of the first request. Herein, the timestamp information may be timestamp information of sending a first request, and may alternatively be timestamp information of receiving the first request.

Step S107: The server determines whether the timestamp information of the first request and the deadline information satisfy a preset second condition. Herein, the deadline information may be a time point or a time range. When the deadline information is a time point, the second condition may be that the timestamp information of the first request is earlier than the deadline information. When the deadline information is a time range, the second condition may be that the timestamp information of the first request is within the time range represented by the deadline information.

Step S108: The server determines the first amount according to the type of the red envelope, if the timestamp information of the first request and the deadline information satisfy the second condition, and the location information of the first terminal and the destination location information satisfy the first condition.

The red envelope implemented by using the LBS in the exemplary embodiments of the present disclosure may be combined with a team activity. For example, when climbing a mountain, an organizer (the second user) may initiate an activity of grabbing a red envelope in a group by using a mobile phone (a second terminal) of the organizer. The destination location information is specified at a place A of a mountaintop and only a member reaches the place A of the mountaintop before 12 o'clock in the morning (the deadline information) can grab the red envelope. When a member S (a first user) in the group reaches the place A of the mountaintop, a mobile phone (a first terminal) of the member S sends a request (a first request) for grabbing the red envelope to a server (a first server 10), the request carries at least current location information, and then the server of the red envelope performs the foregoing step S101 to step S108 and finally returns a message of grabbing the red envelope to the mobile phone of the member S. Referring to FIG. 4B, the interface displays that an amount of the red envelope received by the member S is 100 yuan. The method described in the exemplary embodiment can encourage and motivate people to climb a mountain, and make it easy to determine who first reaches a peak according to a sequence of grabbing the red envelope.

The deadline information in the exemplary embodiment shown in step S106 to step S108 actually sets a life cycle for the activity of grabbing the red envelope. Even if the first user reaches the destination location, the first user cannot grab the red envelope because of being out of the life cycle. As described above, in the method of the exemplary embodiment of the present disclosure, an original red envelope is associated with a location and time based on the LBS and the effective time point. Only when a participant reaches a specified location within the effective time, the participator can have chance to grab the red envelope. In this way, the method provides a technical solution in the exemplary embodiments of the present disclosure that can resolve the problem in that a conventional electronic red envelope, which is simply sent and grabbed online, cannot improve and strengthen the relationship between the users even if it can make a chat atmosphere active.

Figure 7:
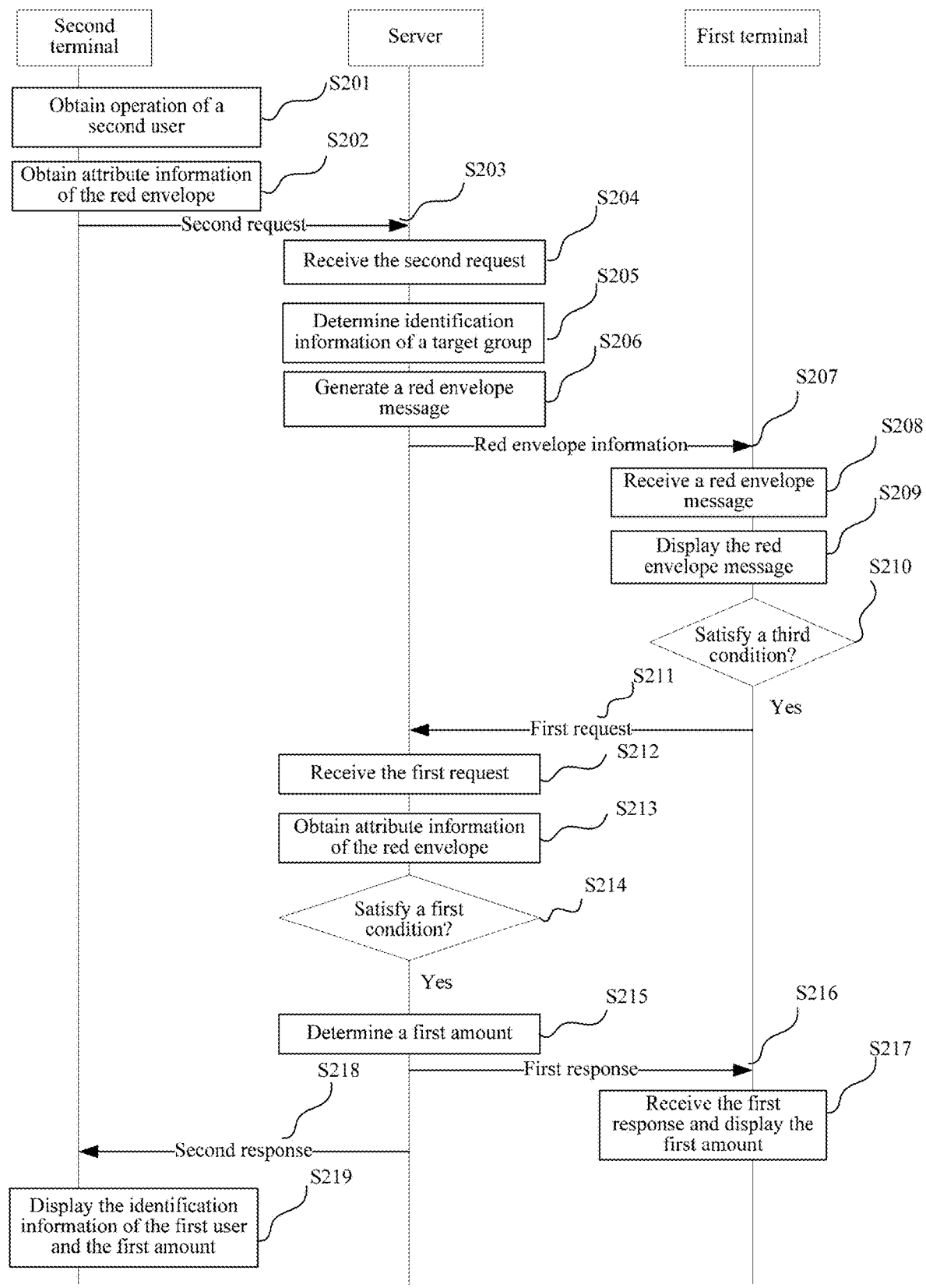
FIG. 7 is a schematic diagram of another process for implementing an information processing method according to an exemplary embodiment of the present disclosure.

Based on the foregoing embodiments, another exemplary embodiment of the present disclosure provides an information processing method. The method is applied to the network architecture shown in FIG. 1. FIG. 7 is a schematic diagram of a process for implementing the information processing method. As shown in FIG. 7, the method may be performed as follows:

Step S201: A second terminal obtains operation of a second user. Herein, the operation of the second user is used for sending a red envelope. For the second user, on an interface of sending the red envelope, needs to determine whether or not an amount is random, a total amount and the number of the red envelopes to be sent. Also, the second user needs to establish the destination location information, by, for example, selecting a geographical location for grabbing the red envelope by using a map plug-in, and setting a time point (deadline information) when the red envelope expires. A red envelope may be sent to an individual or a group. Only a person who receives the red envelope has qualifications to grab the red envelope. It should be noted that when there is only one person in the group, the red envelope is sent to that individual.

Figure 2B:
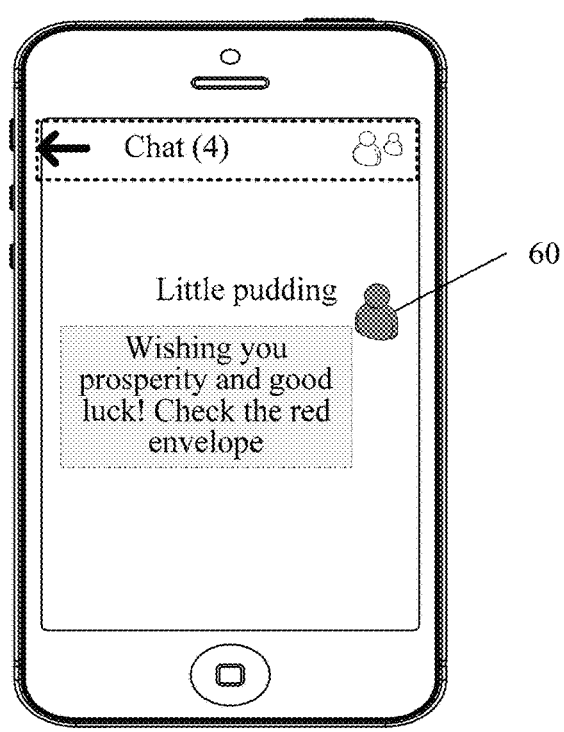

Herein, the example of the team activity in the foregoing embodiments is used in this exemplary embodiment. A team activity of a company T is climbing a mountain. To motivate employees of the company T to join the team activity, an organizer decides to send a red envelope in a group (group members are all employees of the company T). The organizer (the second user) opens the group on a mobile phone (the second terminal) of the organizer, and sends a red envelope in the group. Specifically, for convenience of description, it is assumed that the company T totally has four employees including the organizer. Referring to FIG. 2A, it is assumed that the group is created by including the second user 60 and the first users 401 to 403. Members in the group may include little pudding, dumpling, sweet soup ball and sweet green rice ball, and the organizer is little pudding. In this case, FIG. 2B shows a display interface of the second terminal 30, which is a display interface of the mobile phone of the user (the second user) that sends the red envelope. It can be seen from the display interface that the second user 60, little pudding, sends a red envelope in the group.

Step S202: The second terminal determines, according to the operation of the second user, attribute information of the red envelope. The attribute information of the red envelope may include identification information of the second user, red envelope authority, destination location information, the number of red envelopes and a type of the red envelope.

Herein, the operations of the second user include: selecting the type of the red envelope, determining the number of the red envelopes and the destination location information. The red envelope authority may be automatically determined according to a group (namely, a target group) where the sent red envelope is located. For example, the second user sends the red envelope in a group shown in FIG. 2A, and the red envelope authority of grabbing the red envelope is determined to be the members of the group. In an exemplary implementation process, the red envelope authority may be identification information of the group. When a server or the second terminal finds that the red envelope authority is the identification information of the group, it indicates that the members in the group corresponding to the identification information of the group all have an authority (namely, the red envelope authority) of grabbing the red envelope.

Step S203: The second terminal carries an attribute of the red envelope in a second request, and sends the second request to a server.

Step S204: The sever receives the second request sent by the second terminal. Herein, the second request is used for initiating a request for sending a red envelope, the second request carries at least attribute information of the red envelope, and the attribute information of the red envelope may include identification information of a second user, red envelope authority, destination location information, the number of red envelopes and a type of the red envelope. A terminal corresponding to the second user is the second terminal.

Step S205: The server responds to the second request, and determines, according to the identification information of the second user and/or the red envelope authority, identification information of a target group. Herein, when the second user belongs to only one group, the identification information of the target group may be determined according to only the identification information of the second user. That is, when the second user belongs to only one group, the sent second request also does not need to carry the identification information of the target group. When the second user belongs to more than one group, the second request may or may not carry the identification information of the target group. The identification information of the target group is determined by using the red envelope authority.

Step S206: The server generates a red envelope message according to the identification information of the second user, the destination location information, the number of the red envelopes and the type of the red envelope. Herein, the red envelope message may include at least the destination location information of the red envelope and the red envelope authority of the red envelope. The red envelope message is further used for indicating that the second user initiates the activity of grabbing the red envelope, the number of the red envelopes, the type of the red envelope and a rule of the activity of grabbing the red envelope. The rule of the activity of grabbing the red envelope is that the red envelope can be grabbed only after the destination location is reached.

Step S207: The server sends, according to the identification information of the target group, the red envelope message to a terminal corresponding to each user in the target group. Herein, the terminal corresponding to each user is a first terminal.

Step S208: The first terminal receives an electronic red envelope message sent by a server.

Step S209: The first terminal displays the red envelope message. Herein, for the red envelope message, reference may be made to FIG. 3A. FIG. 3A shows a display interface of the first terminal 201, 202 or 203, which is a display interface of the user (the first user) that grabs the red envelope. In the display interface, the first user can see that the second user 60, little pudding, sends a red envelope in the group. When the first user wants to receive the red envelope, the first user clicks on "receive the red envelope" in a red envelope message 51. Then the display interface of the first terminal is redirected from FIG. 3A to FIG. 3B.

Figure 5:
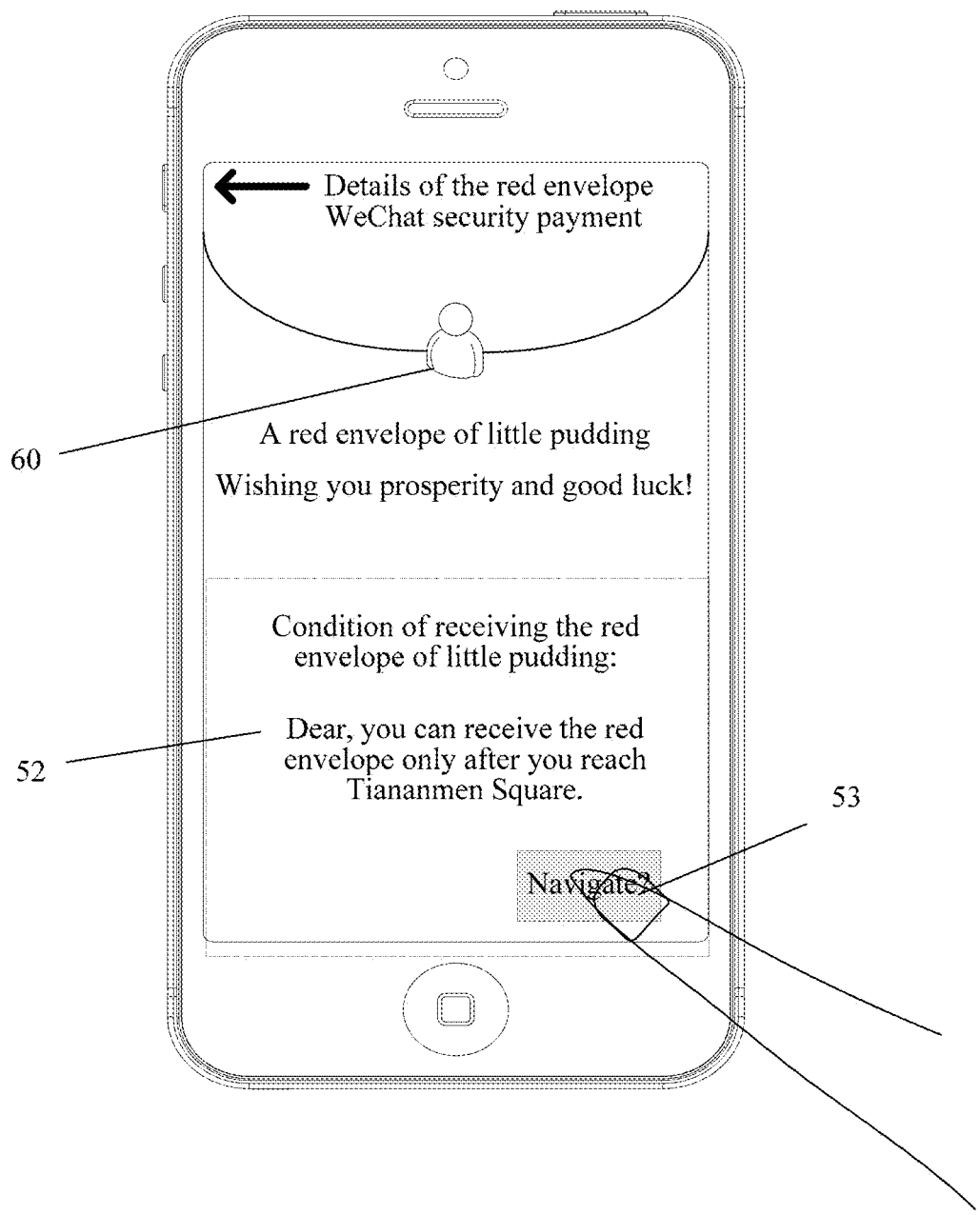
FIG. 5 is a schematic diagram of another scenario according to an exemplary embodiment of the present disclosure.

FIG. 3B displays that the activity of grabbing the red envelope is initiated by little pudding (the second user 60). The rule of the activity of grabbing the red envelope is 52, which reads as "You can receive the red envelope only after you reach Tiananmen Square." That is, Tiananmen Square in the identification 52 may be as destination location information of the red envelope in the activity of grabbing the red envelope. In another embodiment of the present disclosure, the rule of grabbing the red envelope may further include deadline information besides the destination location information. Referring to a rule of grabbing a red envelope shown in FIG. 5, which reads as "Dear, you can receive the red envelope only after you reach Tiananmen Square before ten o'clock tomorrow morning." In the rule, ten o'clock in the morning is the deadline information.

Herein, when the first user sees the destination location information but does not know a location of the destination location information, the red envelope message further provides a navigation function (correspondingly, there is a virtual button or area). Specifically, the method according to the exemplary embodiment of the present disclosure may further include: Step S2091, at which the first terminal responds to the first operation and obtains the current location information of the first terminal; and Step S2092, at which the first terminal generates a navigation route according to the current location information of the first terminal and the destination location information, and displays the navigation route. The first operation may be operation performed on the virtual button or area corresponding to the navigation function in the red envelope message. Referring to FIG. 3B, when the first user does not know how to go to Tiananmen Square, the first user may click on a navigation button 53 on the display interface. Then the first terminal is redirected from the interface shown in FIG. 3B to an interface shown in FIG. 8.

Figure 8:
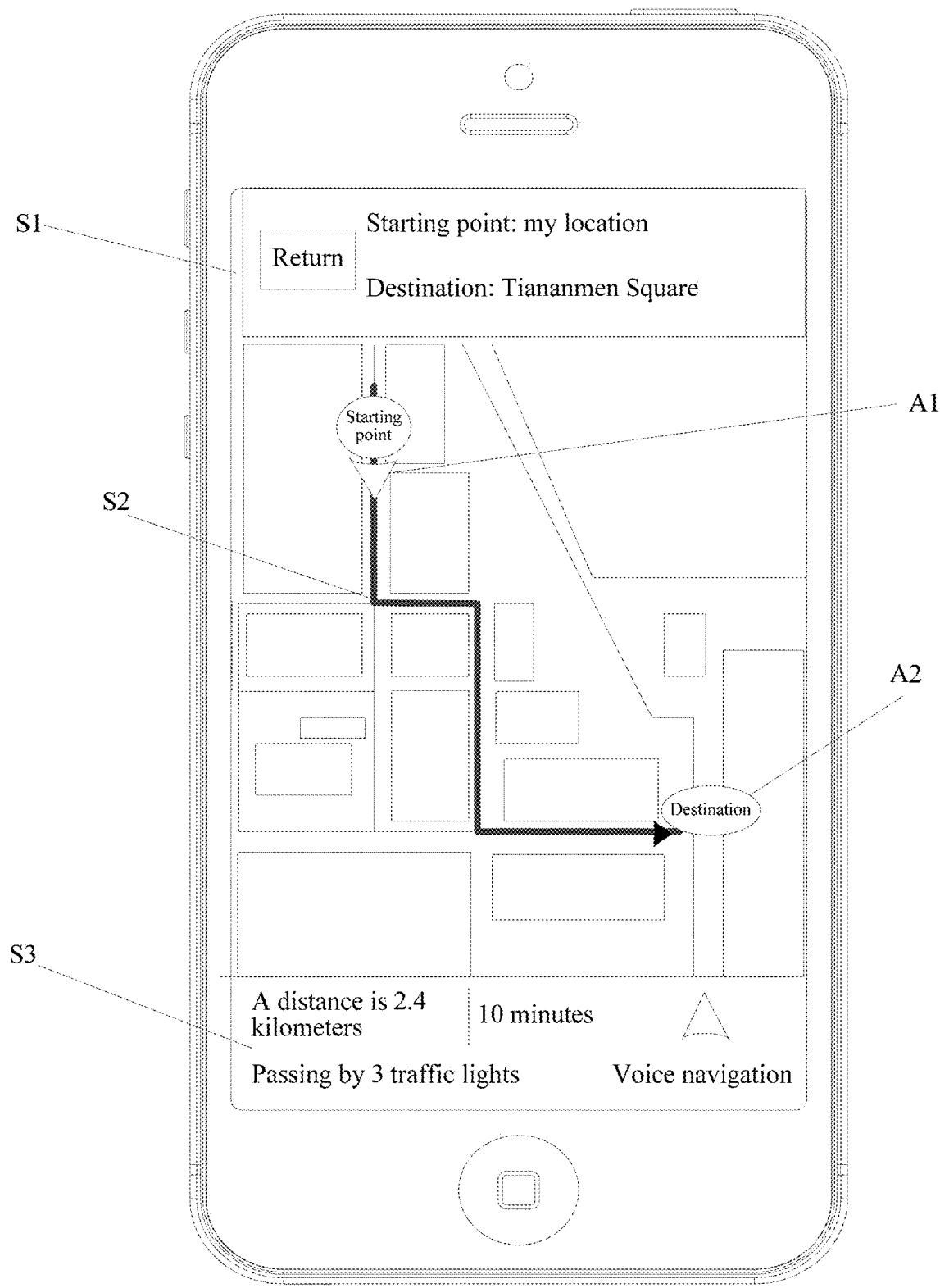
FIG. 8 is a schematic diagram of a scenario of navigation according to an exemplary embodiment of the present disclosure.

FIG. 8 shows a navigation scenario, in which the interface displays three areas S1 to S3 to help the first user to reach the destination location.

The area S1 displays initial position information and destination location information. The initial position information may be current location information (namely, a starting point) of the first user, or a different location information specified by the user. For example, the first user is currently at B, the current location information of the first user is at the B. Although the user is currently at the B, if the user wants to go to the destination location from C, the user may specify the C as the initial position information.

The area S2 displays a map where the navigation route is located. The navigation route is represented by a bold line A3 in the area S2. The area S2 further displays position marks A1 and A2. The position mark A1 is used for marking the initial position information, and the position mark A2 is used for marking the destination location information.

The area S3 is used for displaying a distance from the starting point (corresponding to the initial position information) to the destination location (corresponding to the destination location information) and estimated time of arrival. The area S3 may further display road condition information such as the number of traffic lights of the navigation route, and a voice navigation option.

Step S210: The first terminal determines whether current location information of the first terminal and the destination location information satisfy a preset third condition, and determines whether identification information of a first user satisfies the red envelope authority.

Herein, after the first user sees the red envelope message, if he/she wants to receive the red envelope, he/she starts to act to reach a specified location (a location matching the destination location information, namely, Tiananmen Square). Then the first user takes the first terminal to Tiananmen Square. During movement of the first user, the first terminal obtains the current location information of the first terminal in real time, and determines whether the current location information of the first terminal and the destination location information satisfy the preset third condition.

Herein, the third condition is similar to the first condition in the exemplary embodiment of the present disclosure. The third condition may be the same as the first condition, or may be different from the first condition.

Step S211: The first terminal sends a first request to the server if the current location information of the first terminal and the destination location information satisfy the third condition and the identification information of the first user satisfies the red envelope authority.

Herein, the first request is used for initiating a request for grabbing a red envelope to the server, the first request carries at least the current location information of the first terminal and the identification information of the first user.

Herein, the first request from the first terminal to the server may be automatically sent by the first terminal after automatically determining that conditions are satisfied, or may be sent based on triggering of the user. In this way, the method according to the exemplary embodiment of the present disclosure may further include: Step S21, at which if the current location information of the first terminal and the destination location information satisfy the third condition, the first terminal sends first reminding information, and the first reminding information is used for indicating that the first user has reached the location when the destination location information is located and can grab the red envelope; Step S22, at which the first terminal obtains first operation of the first user on the red envelope message; and Step S23, at which the first terminal responds to the first operation, and sends the first request to the server. The first operation herein may be any operation of clicking on the red envelope message, for example, in a chat session shown in FIG. 3A, clicking on the red envelope message 51, namely, "Wishing you prosperity and good luck." After the first user clicks on the red envelope message 51, the first terminal automatically sends the first request to the server.

Step S212: The sever receives the first request sent by the first terminal. Herein, the first request is used for initiating a request for grabbing a red envelope to the server, the first request carries at least the current location information of the first terminal and the identification information of the first user, and a terminal corresponding to the first user is the first terminal.

Step S213: The server obtains, according to the identification information of the user, attribute information of the red envelope, and the attribute information of the red envelope may include at least destination location information and a type of the red envelope.

Step S214: The server determines whether the location information of the first terminal and the destination location information satisfy a preset first condition.

Step S215: If the location information of the first terminal and the destination location information satisfy the first condition, the server determines a first amount according to the type of the red envelope, and carries the first amount in a first response. Herein, the first amount is used for representing a red envelope amount dispensed to the first terminal.

Step S216: The server sends the first response to the first terminal.

Herein, step S212 to step S216 in the exemplary embodiment of the present disclosure are corresponding to step S101 to step S105 in the foregoing embodiment. Therefore, a person skilled in the art may refer to the foregoing embodiment to understand the foregoing step S201 to step S205.

Step S217: The first terminal receives the first response sent by the server, and displays, according to the first response, the first amount on a display interface of the first terminal. Herein, in an exemplary implementation process, FIG. 4B shows an interface on which an amount of a red envelope received by a user that grabs the red envelope is displayed, and the amount is one 100 yuan.

Step S218: After the server sends the first response to the first terminal, the server carries the identification information of the first user and the first amount in a second response, and the server sends the second response to a second terminal. Herein, the second terminal is a terminal corresponding to a user that sends the red envelope.

Step S219: After the second terminal receives the second response, the second terminal displays the identification information of the first user in the second response. Herein, the first user is a user whose location information and the destination location information satisfy the preset first condition and whose identification information satisfies the red envelope authority and that obtains the red envelope.

In another embodiment, the second response may further carry a first amount obtained by the first user. In this exemplary embodiment, the second response is for informing the second user who receives the red envelope sent by the second user and how much is received.

Based on the foregoing embodiment, an exemplary embodiment of the present disclosure further provides an information processing method. Between the foregoing step S209 to step S210, the method may further include:

Step S9101: The first terminal obtains first operation of the first user on the red envelope message.

Step S9102: the first terminal responds to the first operation and sends a third request to the server. The third request is used for registering with the server to obtain qualifications to obtain the red envelope, and the third request carries the identification information of the first user.

Herein, in an implementation process, the third request may further include identification information of the activity of grabbing the red envelope. That is, after the server receives a second request, the server responds to the second request and allocates identification information to an activity of grabbing a red envelope in the second request. The identification information in this exemplary embodiment may be represented by using a title, code, and so on.

In an exemplary implementation process, the first operation may be clicking on a red envelope message, and so on. It should be noted that for different input devices of an electronic device, types of the first operation may be different. For example, for an input device like a mouse, the first operation may be moving a mouse cursor to the red envelope message; and when a touch input method is used, the first operation may be operation such as clicking on or touching the red envelope message. Herein, referring to FIG. 3A, when the user clicks on an area corresponding to "receive the red envelope" 51 in the red envelope message, the first terminal obtains a first operation. Correspondingly, the first terminal responds to the first operation, and sends a third request to the server. In this exemplary embodiment, if the first user wants to receive the red envelope, first the first user needs to obtain the qualifications to receive the red envelope. After the first user obtains the qualifications to receive the red envelope and reaches the specified location, the first user can grab the red envelope. That is, after the first user receives the red envelope message, the first user needs to click on the red envelope message to obtain the qualifications to obtain the red envelope. After the request is successful, the display interface of the first terminal further prompts "Need map navigation?". If the user selects "Yes", enter a built-in navigation page. As long as the first user reaches the specified location in effective time and there is a red envelope left, the first user can automatically grab the red envelope. When the first user does not reach a destination location, for example, in a process of going to the destination location, and the first user clicks on the red envelope message again, the first terminal directly opens the built-in navigation page, but does not request the server again.

Corresponding to the foregoing steps S9101 and S9102, attribute information of the red envelope may further include red envelope authority. For the server, the method may further include step S9103.

Step S9103: The server receives the third request, then parses identification information of the first user from the third request, and stores the identification information of the first user in association with identification information of the activity of grabbing the red envelope, to form associated information. Herein, the associated information is used for indicating whether the first user has authority or qualifications to grab the red envelope.

The method in the exemplary embodiment of the present disclosure may or may not be associated with the foregoing step S9103. After step S213 and before step S214, the method in the exemplary embodiment of the present disclosure may further include:

Step S9104: The server determines whether the identification information of the user satisfies the red envelope authority. Herein, the red envelope authority may be identification information of a target group, and may alternatively be the associated information in step S9103. That is, there is no inevitable relation between step S9103 and step S9104 in this exemplary embodiment. That is, step S9104 may exist independently from step S9103.

Step S9105: The server determines whether the location information of the first terminal and the destination location information satisfy the preset first condition and enters step S214, if the identification information of the user satisfies the red envelope authority.

Based on the foregoing embodiment, an exemplary embodiment of the present disclosure further provides an information processing method. After step S218, the method may further include:

Step S220: The server obtains identification information of all first users that have succeeded in receiving red envelopes and corresponding first amounts, when time corresponding to the deadline information has come.

Step S221: The server carries the identification information of the first users that has succeeded in receiving the red envelopes and the corresponding first amounts in a third response, and sends the third response to a second terminal, and the third response is used for representing that the first users have succeeded in signing in.

Step S222: The second terminal receives the third response sent by the server. The third response carries the identification information of the first users that has succeeded in receiving the red envelopes and the corresponding first amounts.

The foregoing step S220 to step S222 in the present disclosure may be used in a sign-in scenario. Signing-in may be applied to many aspects in life, for example, movement clocking in. The movement clocking in is a technology using a clock-in manner to supervise and record a movement locus of an athlete during an orientation movement. The clocking in refers to that a device taken by the athlete and a sign-in device of a fixed location perform data interaction, or that a sign-in device obtains identification information of the athlete, to record whether the athlete reaches the location of the sign-in device. The identification information may be voice, a fingerprint, a signature, or the like of the athlete. A company deliberately holds an orienteering activity to encourage employees to participate more in physical exercises. In a place for the orienteering activity, all athletes participating the activity should complete a specified route. To supervise and record movement loci of the athletes, several clock-in sites are disposed on the specified route (it may be considered that there is one or more destination location information in the exemplary embodiment of the present disclosure). An athlete may receive a red envelope after running to a clock-in site. After the athlete receives all red envelopes, it indicates that the athlete completes the orienteering.

The following is described with reference to accompanying drawings. A technical solution provided in the exemplary embodiment of the present disclosure may be used for the following scenario. The orienteering is a common form of the orientation movement. In the type of a competition activity, to supervise and record a movement locus of an athlete, an electronic timing system is widely applied. The electronic timing system usually may include an electronic punching apparatus, a time card, system management software, and so on. In the type of the competition activity, the time card is usually carried by an orienteering athlete. The athlete reaches a corresponding clock-in site (or referred to as a seek point) according to a route marked by an orienteering professional map. A timestamp when an athlete passes the site and a site number are recorded in the card during a read-write process of the time card and an electronic punch card. After the athlete completes all competitions, time and site data information in the time card are processed by using the system management software, thereby obtaining competition time and performance validity, and performing competition ranking. In a related technology, the athlete needs to be equipped with a wearable device having a clock-in chip, so that the costs are relatively high.

When using the technical solution provided in the exemplary embodiments of the present disclosure, the athlete (the first user) does not need to be specially equipped with a time card, and only needs to use a carry-on terminal. The athlete may install application software on a mobile phone. The software may be a movement clock-in application, a social application, a separate application, or a module in an application. An organizer (the second user) sets one or more destination location information. When the organizer sets multiple destination location information, the organizer may rely upon a map and sets several destination locations on the map.

Figure 9:
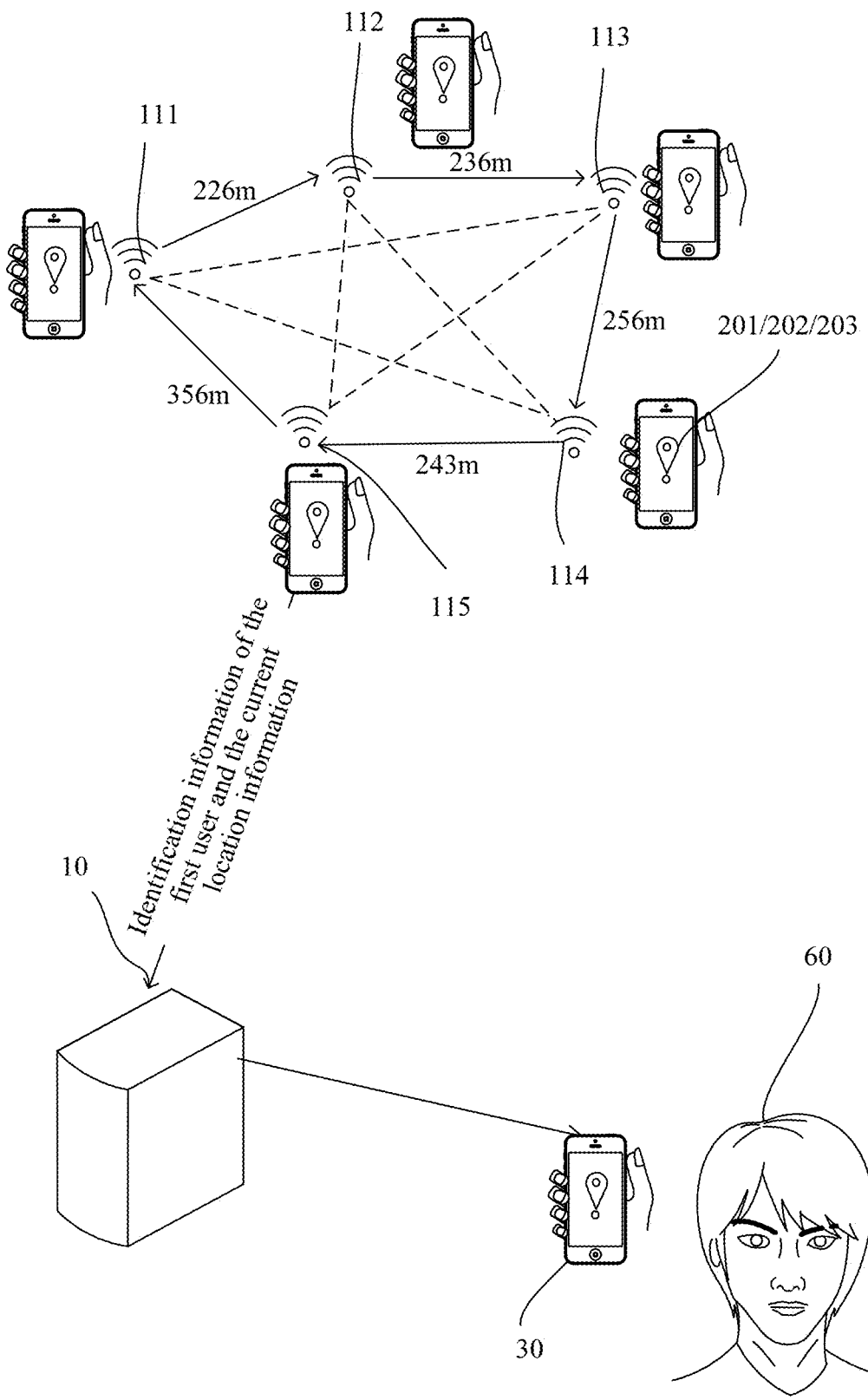
FIG. 9 is a schematic diagram of a scenario according to an exemplary embodiment of the present disclosure.

FIG. 9 shows a schematic diagram of a scenario according to an exemplary embodiment of the present disclosure. In this scenario, an athlete is required to complete an orienteering to receive the red envelopes by reaching numerous clock-in sites (destination location information) in a park C. These clock-in sites, as shown in FIG. 9, include a west gate 111, a north gate 112, an east gate 113, a south gate 114, and a square 115 of the park C. After the athlete reaches all of these clock-in sites (111 to 115), the athlete may receive the red envelopes. By receiving all the red envelopes, it shows that the athlete completes the orienteering.

Figure 10:
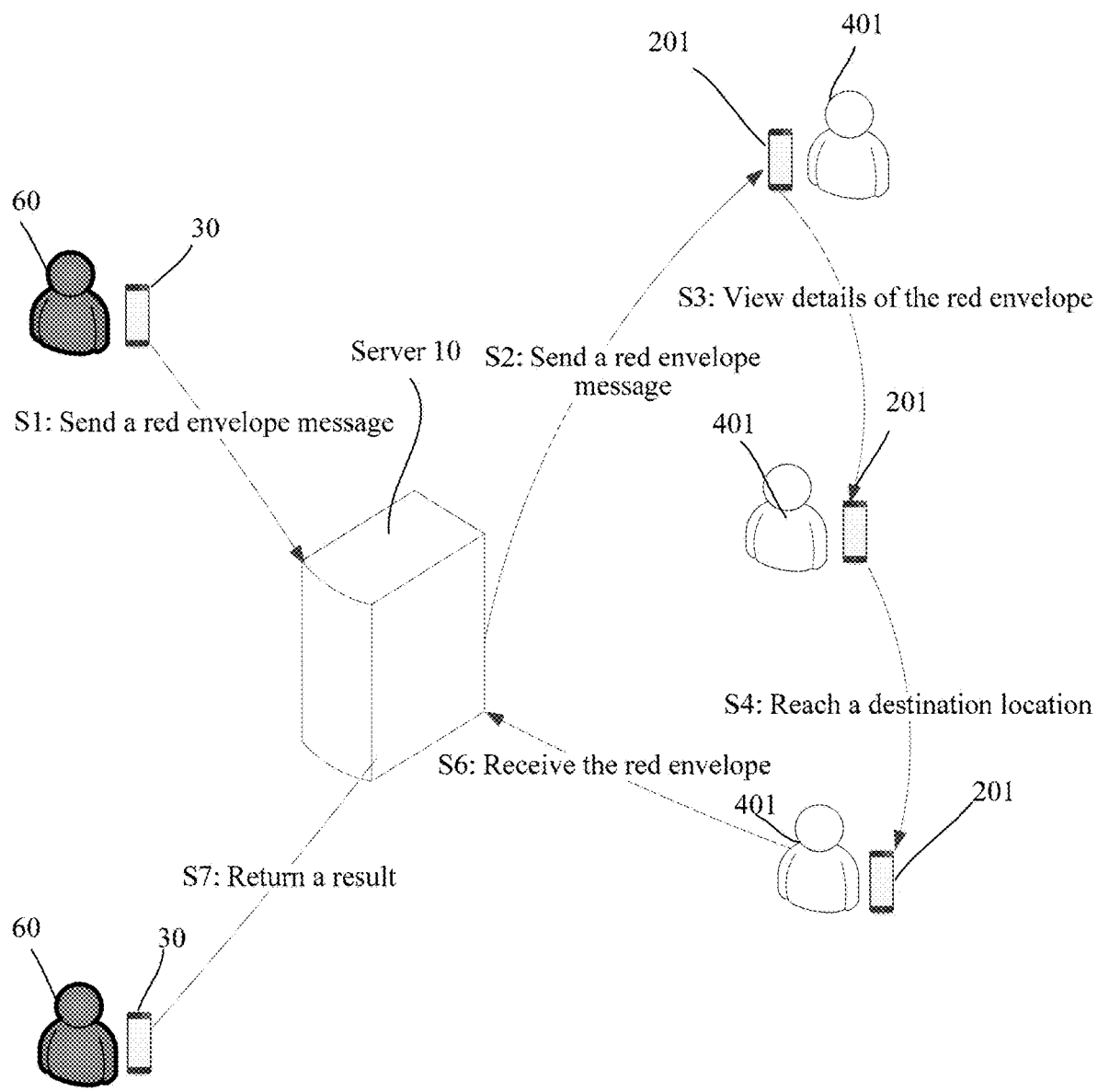
FIG. 10 is a schematic diagram of a process for implementing an information processing method according to an exemplary embodiment of the present disclosure.

Based on the foregoing embodiments, an exemplary embodiment of the present disclosure further provides an information processing method. FIG. 10 is a schematic diagram of a process for implementing an information processing method according to an exemplary embodiment of the present disclosure. As shown in FIG. 10, the method may include:

Step S1: A second user 60 creates a red envelope, and forms a red envelope message having an attribute of the red envelope on the second terminal 30. Herein, during a process of creating the red envelope, the second user 60 needs to set up a total amount and the number of the red envelopes need to be sent, select a type (whether a fixed amount or a random amount) of the red envelope, and determine an effective time and an associated location (the second user 60 selects the location in a map plug-in, and uses the second terminal 30 to convert the associated location to a two-dimensional coordinate, thereby facilitating submitting the associated location to a back-end server 10). The second terminal 30 determines, according to operation of the second user 30, the foregoing information as the attribute of the red envelope, carries the attribute of the red envelope in the red envelope message, and finally submits the attribute of the red envelope to the back-end server 10.

Step S2: The server 10 sends the red envelope. Herein, after the server 10 receives the red envelope message sent by the second terminal 30, the server 10 sends the red envelope message to a group or an individual chat session, and stores identification information of the session (or identification information of the target group) to an attribute of red envelope authority. When the red envelope is grabbed, verification is required. Only a user having the identification information of the session (namely, a user in the session or the target group) has qualifications to participate in grabbing the red envelope.

Step S3: A first user 401 views details of the red envelope and obtains qualifications to grab the red envelope. Herein, after the first user 401 receives the red envelope message, the first user 401 needs to click on the red envelope message. After the first user 401 clicks on the red envelope message, a first terminal 201 requests a token credential (qualifications) to grab the red envelope from the server 10. Only when the first user 401 has the identification information of the session corresponding to the red envelope, and the red envelope has not been totally grabbed and has not expired, the token is returned to the first user 401.

Step S4: The first user 401 moves to a target location according to destination location information in the details of the red envelope. Herein, after the first user 401 succeeds in requesting the token, the first terminal 201 automatically turns on GPS, sets the location information associated with the red envelope as the target location, and then compares a distance between a current location and the target location in a fixed frequency (for example, 5 s once). It should be noted that when the first user 401 clicks on the red envelope message for a second time, the first terminal 201 determines that the first user 401 has currently had the token, and there is no need to request the server 10 again, and directly opens a built-in navigation page.

Step S5: The first user 401 receives the red envelope. Herein, if the GPS determines that a linear distance between the current location and the target location is within 3 m, the first user 401 is considered to have succeeded in reaching the target location (a destination). The first terminal 201 uses identification information of the first user 401, a two-dimensional coordinate of the current geographical location, and the obtained token as parameters, and automatically initiates a request for receiving the red envelope.

Step S6: The server 10 sends the red envelope. After the server 10 receives the request for receiving the red envelope, the server 10 first verifies authority (whether to have qualifications to receive the red envelope) of the first user 401 according to the identification information of the first user 401 and the token, determines whether there is a red envelope left, and time of grabbing the red envelope is within the effective time, and finally compares the current location information of the first terminal 201 with the destination location (the current location must be at the destination location or within the predetermined range of the destination location). If the foregoing conditions are satisfied, the server 10 sends the red envelope to the first terminal 201, and returns a result indicating that grabbing the red envelope is successful to the first terminal 201.

Step S7: The server 10 returns the result to the second terminal 30. After the first user 401 succeeded in receiving the red envelope, the server 10 returns a result of the red envelope distribution to the second terminal 30, to let the second user 60 know who receives the red envelope.

Next, an exemplary embodiment of an information processing system of the present disclosure is described. The system may include a first information processing apparatus (a first apparatus for short), a second information processing apparatus (a second apparatus for short) and a third information processing apparatus (a third apparatus for short). Each unit included in the first apparatus may be implemented by using a processor in a server, each unit included in the second apparatus may be implemented by using a processor in a second terminal, and each unit included in the third apparatus may be implemented by using a processor in a first terminal. It should be noted that a processor for processing information may certainly be implemented by using a specific logic circuit. In a process of a specific embodiment, the processor may be a central processing unit (CPU), a microprocessor unit (MPU), a digital signal processor (DSP), a field programmable gate array (FPGA), or the like.

Figure 11:
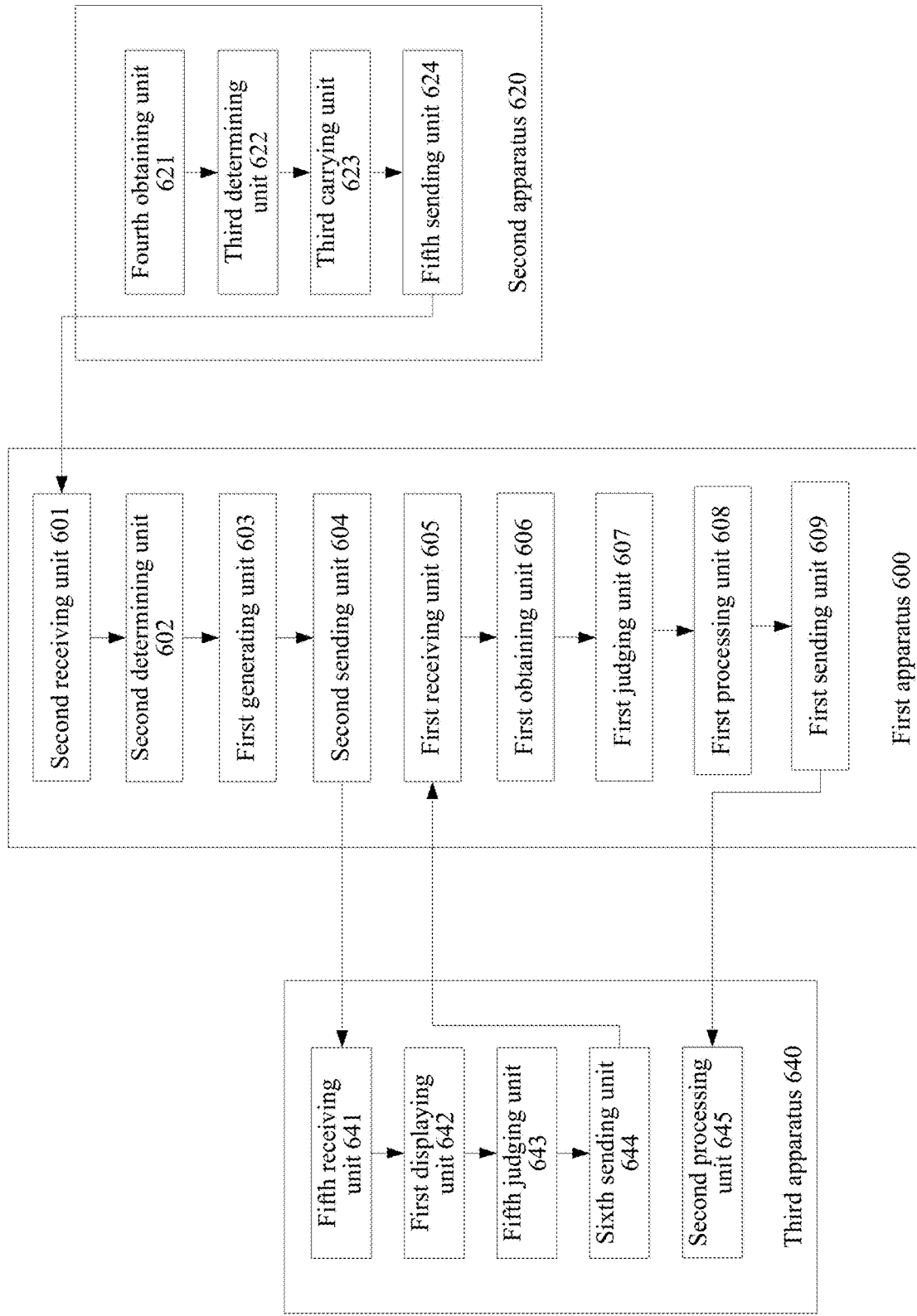
FIG. 11 is a schematic diagram of a composition structure of an information processing system according to an exemplary embodiment of the present disclosure.

FIG. 11 is a schematic diagram of a composition structure of an information processing system according to an exemplary embodiment of the present disclosure. As shown in FIG. 11, the system may include a first apparatus 600, a second apparatus 620 and a third apparatus 640. The first apparatus 600 may include a second receiving unit 601, a second determining unit 602, a first generating unit 603, a second sending unit 604, a first receiving unit 605, a first obtaining unit 606, a first judging unit 607, a first processing unit 608 and a first sending unit 609. The second apparatus 620 may include a fourth obtaining unit 621, a third determining unit 622, third carrying unit 623, and a fifth sending unit 624. The third apparatus 640 may further include a fifth receiving unit 641, a first displaying unit 642, a fifth judging unit 643, a sixth sending unit 644 and a second processing unit 645.

The fourth obtaining unit may be configured to obtain operation of a second user, the operation of the second user is used for sending a red envelope.

The third determining unit determines, according to the operation of the second user, attribute information of the red envelope. The attribute information of the red envelope may include identification information of the second user, red envelope authority, destination location information, a number of red envelopes and a type of the red envelope.

The third carrying unit may be configured to carry the attribute information of the red envelope in a second request.

The fifth sending unit may be configured to send the second request to a server.

The second receiving unit may be configured to receive a second request sent by a second terminal, the second request is used for initiating a request for sending a red envelope, the second request carries at least attribute information of the red envelope, the attribute information of the red envelope may include identification information of a second user, red envelope authority, destination location information, a number of red envelopes and a type of the red envelope, and a terminal corresponding to the second user is the second terminal.

The second determining unit may be configured to respond to the second request, and determine, according to the identification information of the second user and/or the red envelope authority, identification information of a target group.

The first generating unit may be configured to generate a red envelope message according to the identification information of the second user, the destination location information, the number of the red envelopes and the type of the red envelope, the red envelope message may include at least the destination location information of the red envelope and the red envelope authority of the red envelope. The red envelope message is further used for indicating that the second user initiates the activity of grabbing the red envelope, the number of the red envelopes, the type of the red envelope and a rule of the activity of grabbing the red envelope. The rule of the activity of grabbing the red envelope is that the red envelope can be grabbed only after the destination location is reached.

The second sending unit may be configured to send, according to the identification information of the target group, the red envelope message to a terminal corresponding to each user in the target group.

The fifth receiving unit may be configured to receive an electronic red envelope message sent by a server, and the red envelope message may include at least the destination location information of the red envelope and the red envelope authority of the red envelope. The red envelope message is used for indicating that the second user initiates the activity of grabbing the red envelope, the number of the red envelopes, the type of the red envelope and a rule of the activity of grabbing the red envelope. The rule of the activity of grabbing the red envelope is that the red envelope can be grabbed only after the destination location is reached.

The first displaying unit may be configured to display the red envelope message.

The fifth judging unit may be configured to determine whether current location information of the first terminal and the destination location information satisfy a preset first condition, and to determine whether identification information of a first user satisfies the red envelope authority.

The sixth sending unit may be configured to send a first request to the server if the current location information of the first terminal and the destination location information satisfy the third condition and the identification information of the first user satisfies the red envelope authority, the first request is used for initiating a request for grabbing a red envelope to the server, the first request carries at least the current location information of the first terminal and the identification information of the first user.

The first receiving unit may be configured to receive a first request sent by a first terminal, and the first request is used for initiating a request for grabbing a red envelope to the server, the first request carries at least current location information of the first terminal and identification information of a first user, and a terminal corresponding to the first user is the first terminal.

The first obtaining unit may be configured to obtain, according to the identification information of the user, attribute information of the red envelope, and the attribute information of the red envelope may include at least destination location information and a type of the red envelope.

The first judging unit may be configured to determine whether the location information of the first terminal and the destination location information satisfy a preset first condition.

The first processing unit may be configured to determine a first amount according to the type of the red envelope and carry the first amount in a first response if the location information of the first terminal and the destination location information satisfy the first condition, and the first amount is used for representing a red envelope amount dispensed to the first terminal.

The first sending unit may be configured to send the first response to the first terminal.

The second processing unit may be configured to receive a first response sent by the server, and displays the first amount on a display interface according to the first response.

In another embodiment of the present disclosure, the second apparatus may further include: a third receiving unit, configured to receive a second response sent by the server, the second response carries identification information of a first user, and the first user is a user whose location information and the destination location information satisfy a preset first condition, whose identification information satisfies the red envelope authority, and that obtains the red envelope.

In another embodiment of the present disclosure, the attribute information of the red envelope may include deadline information, and the deadline information is used for representing a deadline for stopping dispensing the red envelope; and the first apparatus may further include a first determining unit and a second judging unit.

The first determining unit may be configured to determine timestamp information of the first request.

The second judging unit may be configured to determine whether the timestamp information of the first request and the deadline information satisfy a preset second condition.

The first processing unit is triggered, if the timestamp information of the first request and the deadline information satisfy the second condition, and the location information of the first terminal and the destination location information satisfy the first condition.

In another embodiment of the present disclosure, the attribute information of the red envelope may further include red envelope authority. The first apparatus may further include a third judging unit, configured to determine whether the identification information of the user satisfies the red envelope authority, and the first judging unit is triggered if the identification information of the user satisfies the red envelope authority.

In another embodiment of the present disclosure, the attribute information of the red envelope may further include a total number of red envelopes, and the first apparatus may further include a second obtaining unit and a fourth judging unit.

The second obtaining unit may be configured to obtain a number of red envelopes that have been currently sent.

The fourth judging unit may be configured to determine whether the number of the red envelopes that have been currently sent is less than the total number of the red envelopes, and the first processing unit is triggered if the number of the red envelopes that have been currently sent is less than the total number of the red envelopes.

In another embodiment of the present disclosure, the apparatus may further include a first carrying unit and a third sending unit.

The first carrying unit may be configured to carry the identification information of the first user and the first amount in a second response after sending the first response to the first terminal.

The third sending unit may be configured to send the second response to a second terminal, and the second terminal is a terminal corresponding to a user that sends the red envelope.

In another embodiment of the present disclosure, the first apparatus may further include a third obtaining unit, a second carrying unit and a fourth sending unit.

The third obtaining unit may be configured to obtain identification information of all first users and a corresponding first amount, when time corresponding to the deadline information has come.

The second carrying unit may be configured to carry the identification information of the first users and the corresponding first amount in a third response.

The fourth sending unit may be configured to send the third response to a second terminal, and the third response is used for representing that the first users have succeeded in signing in.

In another embodiment of the present disclosure, the second apparatus may further include a fourth receiving unit configured to receive a third response sent by the server, and the third response carries the identification information of the first users and the corresponding first amount.

In another embodiment of the present disclosure, the third apparatus may further include a fifth obtaining unit and a seventh sending unit.

The fifth obtaining unit may be configured to obtain first operation of the first user on the red envelope message.

The seventh sending unit may be configured to respond to the first operation and send a third request to the server. The third request is used for registering with the server to obtain qualifications to grab the red envelope, and the third request carries the identification information of the first user.

In another embodiment of the present disclosure, the third apparatus may further include a sixth obtaining unit, a second generating unit and a second displaying unit.

The sixth obtaining unit may be configured to respond to the first operation and obtain the current location information of the first terminal.

The second generating unit may be configured to generate a navigation route according to the current location information of the first terminal and the destination location information.

The second displaying unit may be configured to display the navigation route.

In another embodiment of the present disclosure, the third apparatus may further include an output unit, a seventh obtaining unit and an eighth sending unit.

The output unit may be configured, if the current location information of the first terminal and the destination location information satisfy the third condition, the first terminal outputs first prompting information, and the first prompting information is used for indicating that a first user has reached a location located by the destination location information and can grab the red envelope.

The seventh obtaining unit may be configured to obtain first operation of the first user on the red envelope message.

The eighth sending unit may be configured to respond to the first operation and send a first request to the server.

Herein, it should be noted that descriptions of the foregoing apparatus embodiments are similar to the descriptions of the foregoing method embodiments. The apparatus embodiments have similar beneficial effects to the method embodiments. Therefore, details are not described herein. To understand technical details that are not disclosed in the apparatus embodiments of the present disclosure, reference may be made to the descriptions of the method embodiments of the present disclosure. To save space, details are not described herein.

Based on the foregoing embodiments, an exemplary embodiment of the present disclosure provides a server. The server may include a first external communications interface and a first processor. The first processor may be configured to:

receive, by using the first external communications interface, a first request sent by a first terminal, the first request being used for initiating a request for grabbing a red envelope to the server, the first request carrying at least current location information of the first terminal and identification information of a first user, and a terminal corresponding to the first user being the first terminal;

obtain, according to the identification information of the user, attribute information of the red envelope, the attribute information of the red envelope including at least destination location information and a type of the red envelope;

determine whether the location information of the first terminal and the destination location information satisfy a preset first condition;

determine a first amount according the type of the red envelope and carrying the first amount in a first response if the location information of the first terminal and the destination location information satisfy the first condition, the first amount being used for representing a red envelope amount dispensed to the first terminal; and send a first response to the first terminal by using the first external communications interface.

Herein, it should be noted that descriptions of the foregoing server embodiments are similar to the descriptions of the foregoing method embodiments. The server embodiments have same beneficial effects as the method embodiments. Therefore, details are not described herein. For technical details that are not disclosed in the server embodiments of the present disclosure, a person skilled in the art refers to the descriptions of the method embodiments of the present disclosure to understand. To save space, details are not described herein.

Based on the foregoing embodiments, an exemplary embodiment of the present disclosure provides a second terminal. The second terminal may include an output device, a second external communications interface and a second processor. The second processor may be configured to:

obtain operation of a second user by using the output device, the operation of the second user being used for sending a red envelope;

determine, according to the operation of the second user, attribute information of the red envelope, the attribute information of the red envelope including at least identification information of the second user, red envelope authority and destination location information;

carry the attribute information of the red envelope in a second request, and send the second request to a server by using the second external communications interface; and receive a second response sent by the server by using the second external communications interface, the second response carrying identification information of a first user, and the first user being a user whose location information and the destination location information satisfy a preset first condition, whose identification information satisfies the red envelope authority, and that obtains the red envelope, namely, a user that succeeds in grabbing the red envelope.

In another embodiment of the present disclosure, the processor is further configured to receive a third response sent by the server by using the second external communications interface, the third response carries the identification information of the first users and the corresponding first amount, and the third response is used for representing that the first users have succeeded in signing in.

Herein, it should be noted that descriptions of the foregoing second terminal embodiment are similar to the descriptions of the foregoing method embodiments. The second terminal embodiment has same beneficial effects as the method embodiments. Therefore, details are not described herein. For technical details that are not disclosed in the second terminal embodiment of the present disclosure, a person skilled in the art refers to the descriptions of the method embodiments of the present disclosure to understand. To save space, details are not described herein.

Based on the foregoing embodiments, an exemplary embodiment of the present disclosure provides a first terminal. The first terminal may further include a third external communications interface, a display and a third processor. The third processor may be configured to:

receive a red envelope message sent by a server by using the third external communications interface, the red envelope message including at least destination location information of the red envelope and red envelope authority of the red envelope;

Herein, the red envelope message is further used for indicating that the second user initiates the activity of grabbing the red envelope, the number of the red envelopes, the type of the red envelope and a rule of the activity of grabbing the red envelope. The rule of the activity of grabbing the red envelope is that the red envelope can be grabbed only after the destination location is reached.

display the red envelope message on the display;

determine whether current location information of the first terminal and the destination location information satisfy a preset third condition, and determine whether identification information of a first user satisfies the red envelope authority; and send a first request to the server by using the third external communications interface if the current location information of the first terminal and the destination location information satisfy the third condition and the identification information of the first user satisfies the red envelope authority, the first request being used for initiating a request for grabbing a red envelope to the server, the first request carries at least the current location information of the first terminal and the identification information of the first user.

Herein, it should be noted that descriptions of the foregoing first terminal embodiment are similar to the descriptions of the foregoing method embodiments. The first terminal embodiment has same beneficial effects as the method embodiments. Therefore, details are not described herein. For technical details that are not disclosed in the first terminal embodiment of the present disclosure, a person skilled in the art refers to the descriptions of the method embodiments of the present disclosure to understand. To save space, details are not described herein.

It should be understood that "an exemplary embodiment" mentioned in the whole specification means that particular features, structures, or characteristics related to the exemplary embodiment are included in at least one embodiment of the present disclosure. Therefore, "in an exemplary embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the exemplary embodiments of the present disclosure. The sequence numbers of the preceding embodiments of the present disclosure are merely for description purpose but do not indicate the preference of the exemplary embodiments.

It should be noted that the terms "include", "comprise", or any other variation thereof in this specification is intended to cover a non-exclusive inclusion. Therefore, in the context of a process, method, article, or apparatus that may include a series of elements, the process, method, article, or apparatus not only may include such elements, but also may include other elements not specified expressly, or may include inherent elements of the process, method, article, or apparatus. Unless otherwise specified, an element limited by "include a/an . . . " does not exclude other same elements existing in the process, the method, the object, or the apparatus that may include the element.

In the several embodiments provided in the present disclosure, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the exemplary embodiments.

In addition, functional units in the exemplary embodiments of the present disclosure may be all integrated in a processing unit, each unit is separately used as a unit, or two or more units are integrated in a unit. The integrated unit may be implemented in a form of hardware, or may be implemented in form of hardware plus a software functional unit.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the foregoing method embodiments are performed. The foregoing storage medium may include various mediums capable of storing program codes, such as a portable storage device, a read-only memory (ROM), a magnetic disk, or an optical disk.

Alternatively, when the integrated unit of the present disclosure is implemented in a form of a software functional module and sold or used as an independent product, the integrated unit may be stored in a computer-readable storage medium. Based on such an understanding, the technical solutions of the exemplary embodiments of the present disclosure essentially, or the part contributing to the existing technology may be implemented in a form of a software product. The computer software product is stored in a storage medium and may include several instructions for instructing a computer device (which may be a personal computer, a server, a network device, or the like) to perform all or some of the methods described in the exemplary embodiments of the present disclosure. The foregoing storage medium may include various mediums capable of storing program codes, such as a portable storage device, a ROM, a magnetic disk, or an optical disk.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information processing method performed at a computer server that is communicatively connected with a first terminal associated with a first user and a second terminal associated with a second user, the method comprising:

prior to a first request, receiving from the second terminal a second request for initiating a request to send an electronic red envelope by the second user to a chat session associated with a chat group of users of a social networking application hosted by the computer server in form of a group chat message, wherein the chat group of users include the first user and the second user and the second request carries attribute information of the red envelope, including:

a destination location at which the red envelope will be dispensed;

an associated time deadline for stopping dispensing the red envelope;

identification information of the second user;

red envelope authority that is determined according to user identification of each user in the chat group of users;

a total number of red envelopes to be dispensed; and a type of the red envelope, including a fixed amount type or a random amount type;

determining identification information of the chat session;

adding the identification information of the chat session to the red envelope authority;

generating a red envelope message according to the second request, the red envelope message including the identification information of the second user, information of the destination location, the total number of the red envelopes, the type of the red envelope, the red envelope authority, the associated time deadline, and a rule that the red envelope will be distributed when a user of the chat group of users reaches the destination location within the associated time deadline;

sending, according to the identification information of the chat session, the red envelope message to the chat group of users, including causing the red envelope message to be displayed on respective terminals associated with the chat group of users;

after the sending, receiving from the first terminal the first request for the electronic red envelope, wherein the first request is generated by the first terminal in response to a selection of the red envelope message by the first user;

in response to the first request:
  determining whether the first user has identification information that corresponds to the identification information of the chat session;
  in accordance with a determination that (i) the identification of the first user corresponds to the identification information of the chat session, (ii) the total number of red envelopes to be dispensed is a positive integer, and (iii) the associated time deadline for stopping dispensing the red envelope has yet to be expired:
    generating a token for the first terminal; and
    returning the token to the first terminal, wherein the returning causes activation of a location-based service on the first terminal, wherein the location-based service on the first terminal is configured to generate navigation information from a current location of the first terminal to the destination location;

receiving a third request from the first terminal for claiming the red envelope, the third request including an updated location information of the first terminal;

in accordance with the third request:
  verifying, according to the token, that the first terminal has authority to receive the red envelope;
  after verifying that the first terminal has the authority to receive the red envelope, determining whether the updated current location information of the first terminal and the information of the destination location satisfy a preset first condition and whether a current timestamp of the first terminal and the time deadline information satisfy a preset second condition, in accordance with the rule;
  in accordance with a determination that the updated current location information of the first terminal and the information of the destination location satisfy the preset first condition, and the current timestamp of the first terminal and the time deadline information satisfy the preset second condition, determining a first amount of the red envelope according to the type of the red envelope;
  allocating the first amount from an account of the second user to an account of the first user; and
  sending a chat message indicating dispensing of the red envelope to the first user to the chat session.

2. The method according to claim 1, wherein determining the first amount further comprises:
  obtaining a number of red envelopes that have been currently sent;
  determining whether the number of the red envelopes that have been currently sent is fewer than the total number of the red envelopes; and
  wherein the determining the first amount is in accordance with a determination that the number of the red envelopes that have been currently sent is fewer than the total number of the red envelopes.

3. The method according to claim 1, further comprising:
  obtaining the identification information of the first user who has succeeded in receiving the red envelope and the first amount at a time corresponding to the time deadline information; and
  carrying the identification information of the first user who has succeeded in receiving the red envelope and the first amount in a fourth response, and sending the fourth response to the second terminal, the third response being used for representing that the first user has succeeded in signing in.

4. The method according to claim 1, wherein the destination location consists of longitude and latitude information, and the first condition is satisfied when the updated current location information of the first terminal matches the longitude and latitude information.

5. The method according to claim 1, wherein the associated time deadline for stopping dispensing the red envelope is a time range deadline, and the second condition is satisfied if the current timestamp information of the first terminal is within the time range deadline.

6. A computer server that is communicatively connected with a first terminal associated with a first user and a second terminal associated with a second user, comprising:
  one or more processors;
  memory coupled to the one or more processors; and
  a plurality of instructions stored in the memory that, when executed by the one or more processors, cause the computer server to perform operations comprising:
    prior to a first request, receiving from the second terminal a second request for initiating a request to send an electronic red envelope by the second user to a chat session associated with a chat group of users of a social networking application hosted by the computer server in form of a group chat message, wherein the chat group of users include the first user and the second user and the second request carries attribute information of the red envelope, including:
      a destination location at which the red envelope will be dispensed;
      an associated time deadline for stopping dispensing the red envelope;
      identification information of the second user;
      red envelope authority that is determined according to user identification of each user in the chat group of users;
      a total number of red envelopes to be dispensed; and
      a type of the red envelope, including a fixed amount type or a random amount type;
    determining identification information of the chat session;
    adding the identification information of the chat session to the red envelope authority;
    generating a red envelope message according to the second request, the red envelope message including the identification information of the second user, information of the destination location, the total number of the red envelopes, the type of the red envelope, the red envelope authority, the associated time deadline, and a rule that the red envelope will be distributed when a user of the chat group of users reaches the destination location within the associated time deadline;
    sending, according to the identification information of the chat session, the red envelope message to the chat group of users, including causing the red envelope message to be displayed on respective terminals associated with the chat group of users;

after the sending, receiving from the first terminal the first request for the electronic red envelope, wherein the first request is generated by the first terminal in response to a selection of the red envelope message by the first user;

in response to the first request:

determining whether the first user has identification information that corresponds to the identification information of the chat session;

in accordance with a determination that (i) the identification of the first user corresponds to the identification information of the chat session, (ii) the total number of red envelopes to be dispensed is a positive integer, and (iii) the associated time deadline for stopping dispensing the red envelope has yet to be expired:

generating a token for the first terminal; and returning the token to the first terminal, wherein the returning causes activation of a location-based service on the first terminal, wherein the location-based service on the first terminal is configured to generate navigation information from a current location of the first terminal to the destination location;

receiving a third request from the first terminal for claiming the red envelope, the third request including an updated location information of the first terminal;

in accordance with the third request:

verifying, according to the token, that the first terminal has authority to receive the red envelope;

after verifying that the first terminal has the authority to receive the red envelope, determining whether the updated current location information of the first terminal and the information of the destination location satisfy a preset first condition and whether a current timestamp of the first terminal and the time deadline information satisfy a preset second condition, in accordance with the rule;

in accordance with a determination that the updated current location information of the first terminal and the information of the destination location satisfy the preset first condition, and the current timestamp of the first terminal and the time deadline information satisfy the preset second condition, determining a first amount of the red envelope according to the type of the red envelope;

allocating the first amount from an account of the second user to an account of the first user; and sending a chat message indicating dispensing of the red envelope to the first user to the chat session.

7. The computer server according to claim 6, wherein determining the first amount further comprises:

obtaining a number of red envelopes that have been currently sent;

determining whether the number of the red envelopes that have been currently sent is fewer than the total number of the red envelopes; and wherein the determining the first amount is in accordance with a determination that the number of the red envelopes that have been currently sent is fewer than the total number of the red envelopes.

8. The computer server according to claim 6, the plurality of instructions further cause the computer server to perform operations comprising:

obtaining the identification information of the first user who has succeeded in receiving the red envelope and the first amount at a time corresponding to the time deadline information; and carrying the identification information of the first user who has succeeded in receiving the red envelope and the first amount in a fourth response, and sending the third response to the second terminal, the fourth response being used for representing that the first user has succeeded in signing in.

9. The computer server according to claim 6, wherein the destination location consists of longitude and latitude information, and the first condition is satisfied when the current location information of the first terminal matches the longitude and latitude information.

10. The computer server according to claim 6, wherein the associated time deadline for stopping dispensing the red envelope is a time range deadline, and the second condition is satisfied if the current timestamp information of the first terminal is within the time range deadline.

11. A non-transitory computer readable storage medium storing a plurality of instructions configured for execution by one or more processors of a computer server, wherein the computer server is communicatively connected with a first terminal associated with a first user and a second terminal associated with a second user, the plurality of instructions, when executed by the one or more processors, cause the computer server to perform operations comprising:

prior to a first request, receiving from the second terminal a second request for initiating a request to send an electronic red envelope by the second user to a chat session associated with a chat group of users of a social networking application hosted by the computer server in form of a group chat message, wherein the chat group of users include the first user and the second user and the second request carries attribute information of the red envelope, including:

a destination location at which the red envelope will be dispensed;

an associated time deadline for stopping dispensing the red envelope;

identification information of the second user;

red envelope authority that is determined according to user identification of each user in the chat group of users;

a total number of red envelopes to be dispensed; and a type of the red envelope, including a fixed amount type or a random amount type;

determining identification information of the chat session;

adding the identification information of the chat session to the red envelope authority;

generating a red envelope message according to the second request, the red envelope message including the identification information of the second user, information of the destination location, the total number of the red envelopes, the type of the red envelope, the red envelope authority, the associated time deadline, and a rule that the red envelope will be distributed when a user of the chat group of users reaches the destination location within the associated time deadline;

sending, according to the identification information of the chat session, the red envelope message to the chat group of users, including causing the red envelope message to be displayed on respective terminals associated with the chat group of users;

after the sending, receiving from the first terminal the first request for the electronic red envelope, wherein the first request is generated by the first terminal in response to a selection of the red envelope message by the first user;

in response to the first request:
 determining whether the first user has identification information that corresponds to the identification information of the chat session;
 in accordance with a determination that (i) the identification of the first user corresponds to the identification information of the chat session, (ii) the total number of red envelopes to be dispensed is a positive integer, and (iii) the associated time deadline for stopping dispensing the red envelope has yet to be expired:
  generating a token for the first terminal; and
  returning the token to the first terminal, wherein the returning causes activation of a location-based service on the first terminal, wherein the location-based service on the first terminal is configured to generate navigation information from a current location of the first terminal to the destination location;

receiving a third request from the first terminal for claiming the red envelope, the third request including an updated location information of the first terminal;

in accordance with the third request:
 verifying, according to the token, that the first terminal has authority to receive the red envelope;
 after verifying that the first terminal has the authority to receive the red envelope, determining whether the updated current location information of the first terminal and the information of the destination location satisfy a preset first condition and whether a current timestamp of the first terminal and the time deadline information satisfy a preset second condition, in accordance with the rule;
 in accordance with a determination that the updated current location information of the first terminal and the information of the destination location satisfy the preset first condition, and the current timestamp of the first terminal and the time deadline information satisfy the preset second condition, determining a first amount of the red envelope according to the type of the red envelope;
 allocating the first amount from an account of the second user to an account of the first user; and
 sending a chat message indicating dispensing of the red envelope to the first user to the chat session.

* * * * *